Figure 43:
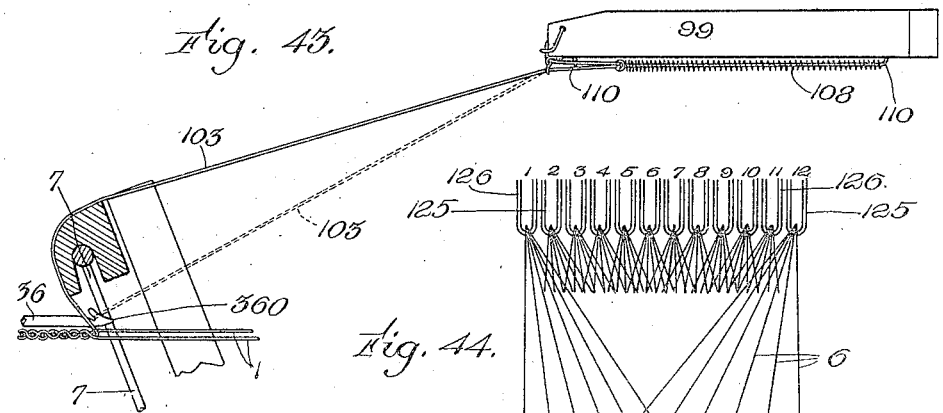

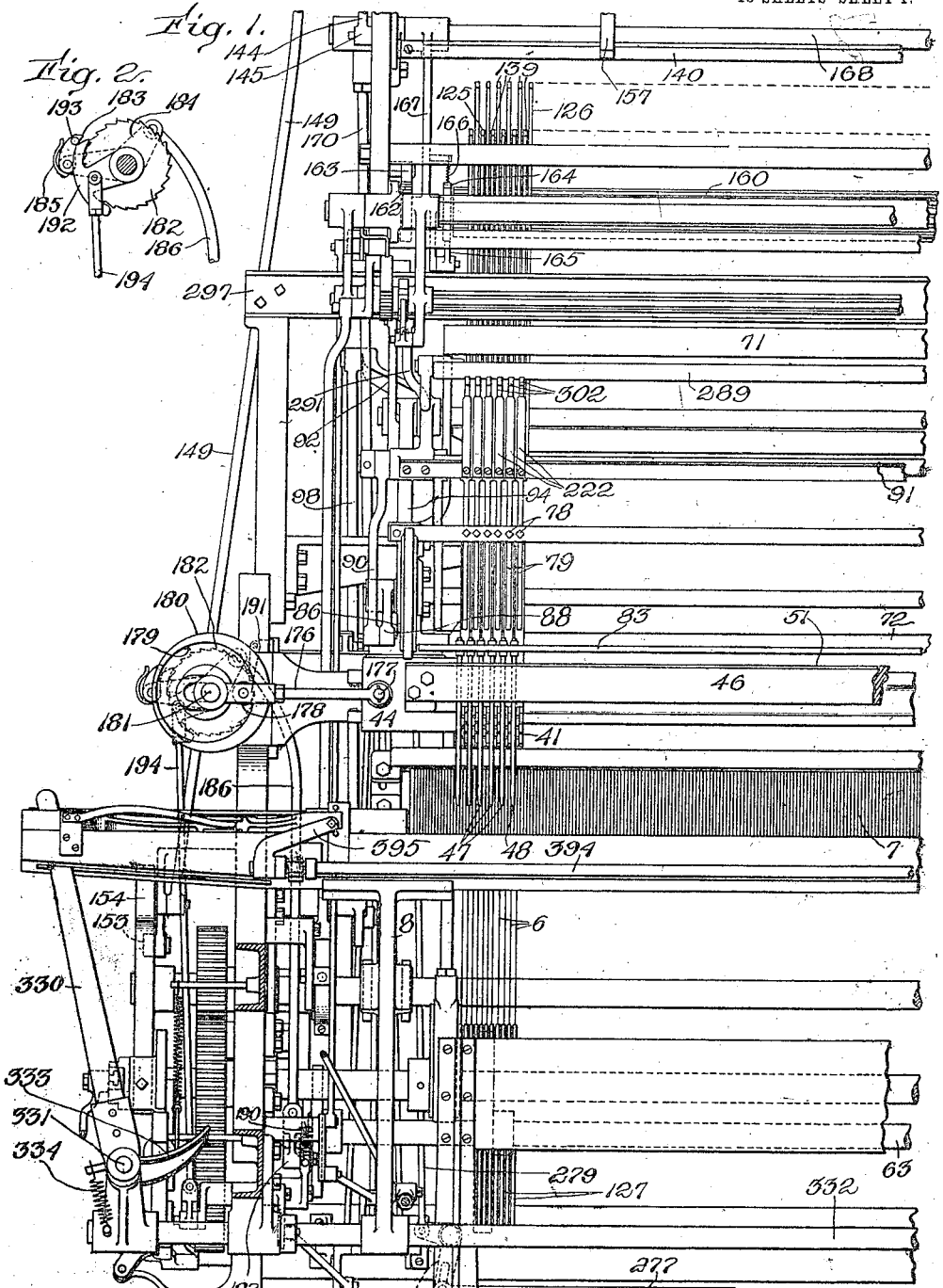

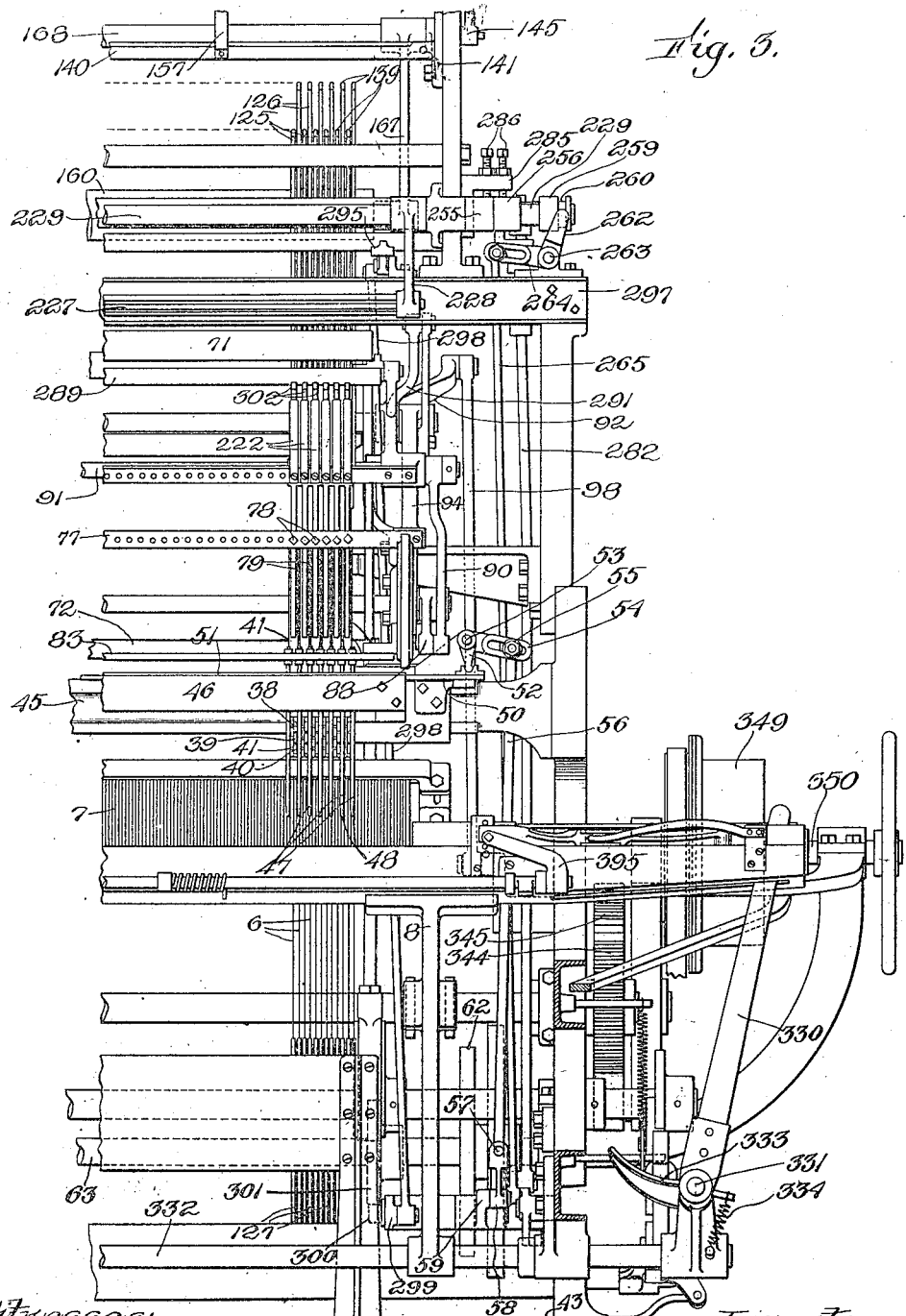

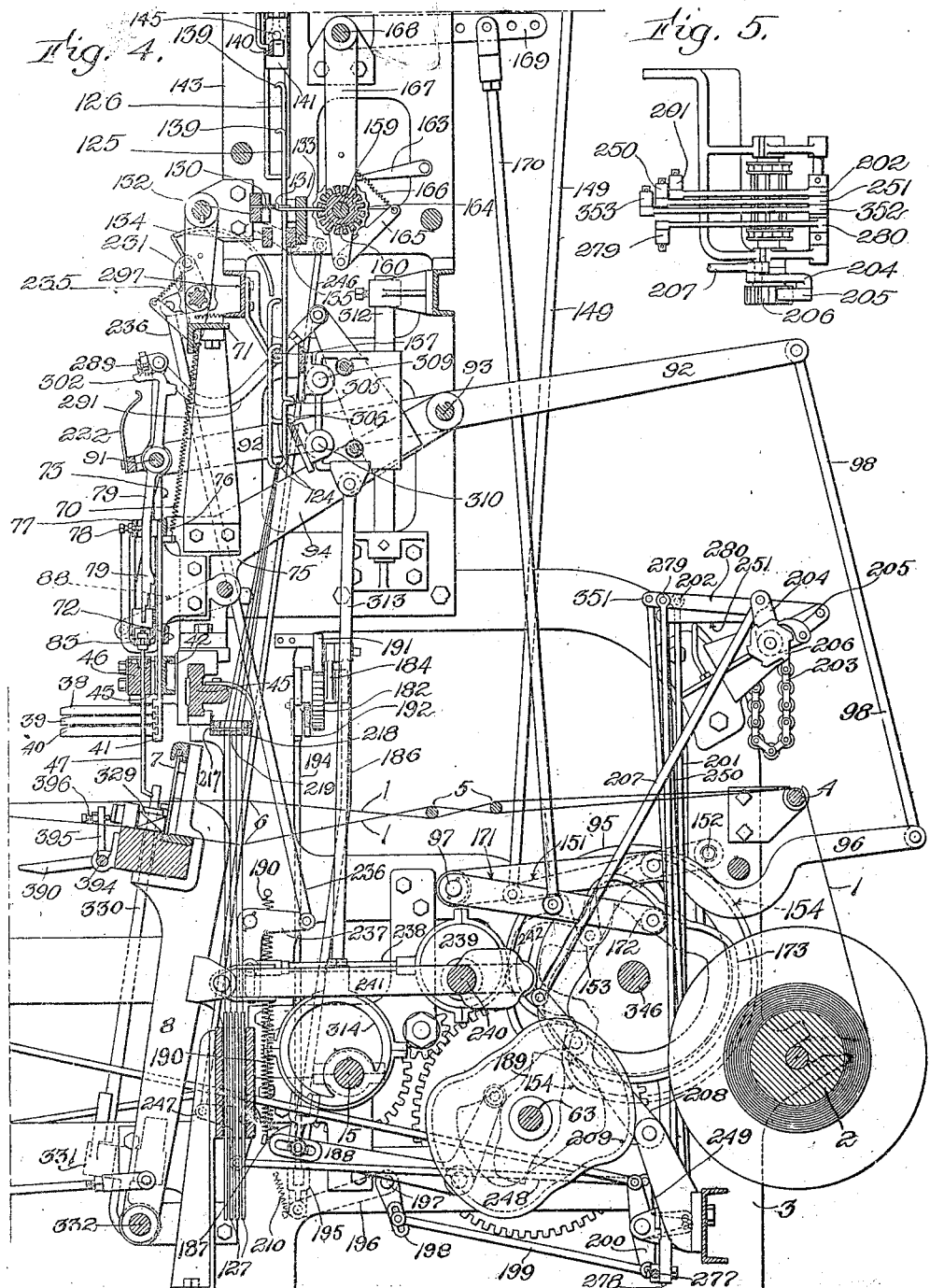

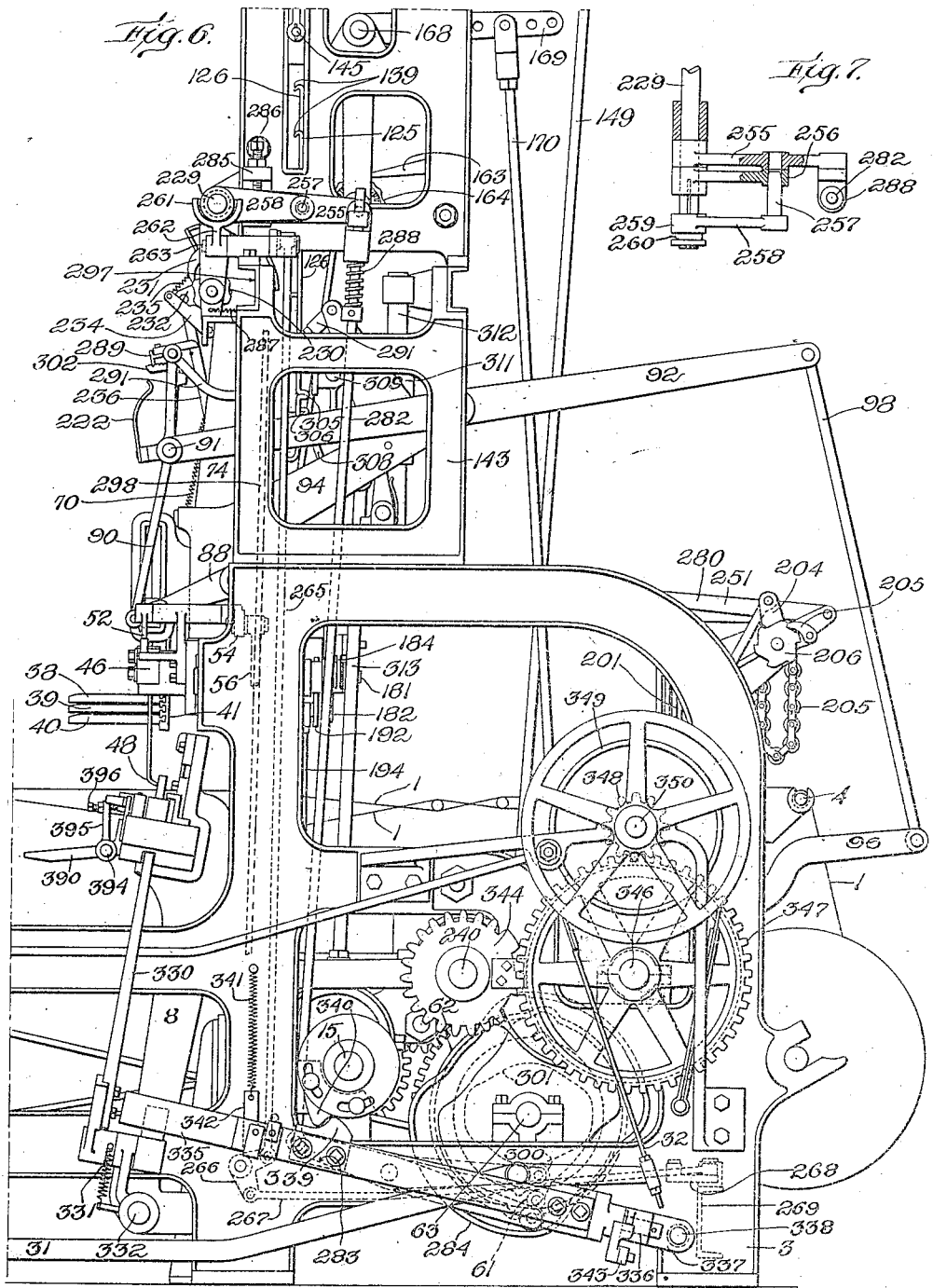

T. P. WALSH.
LOOM.
APPLICATION FILED FEB. 5, 1910.
1,069,651.
Patented Aug. 5, 1913.
18 SHEETS—SHEET 5.
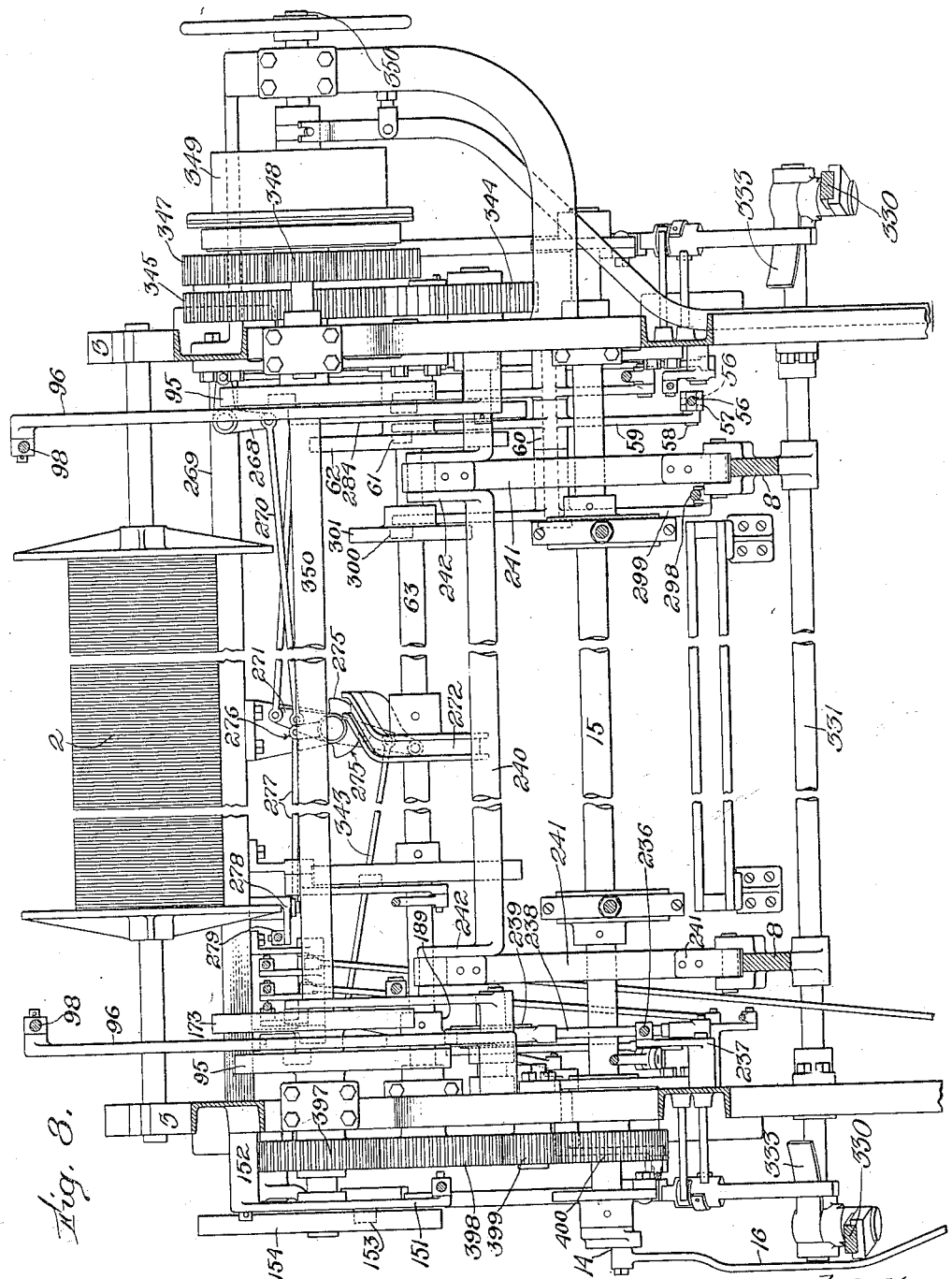

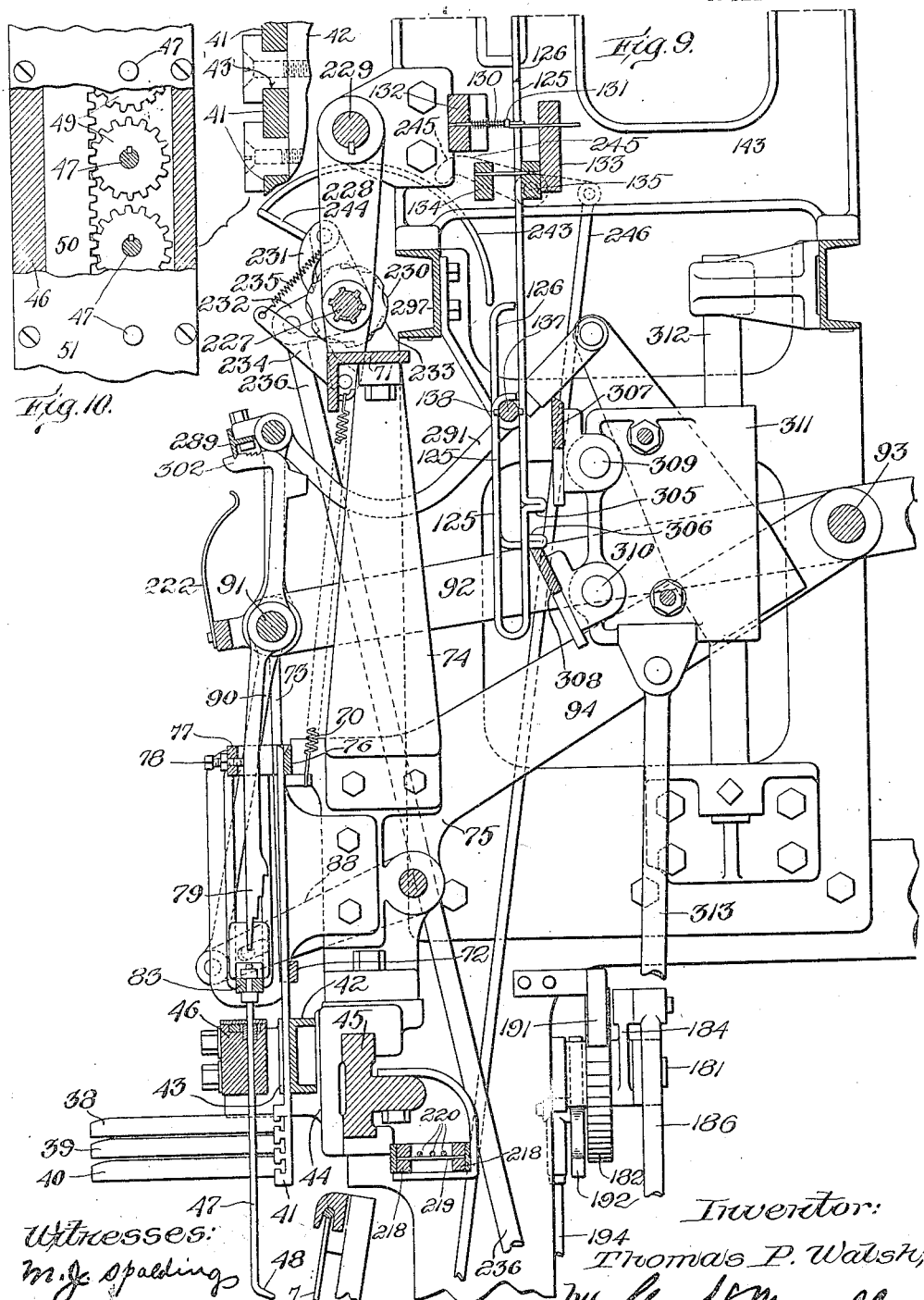

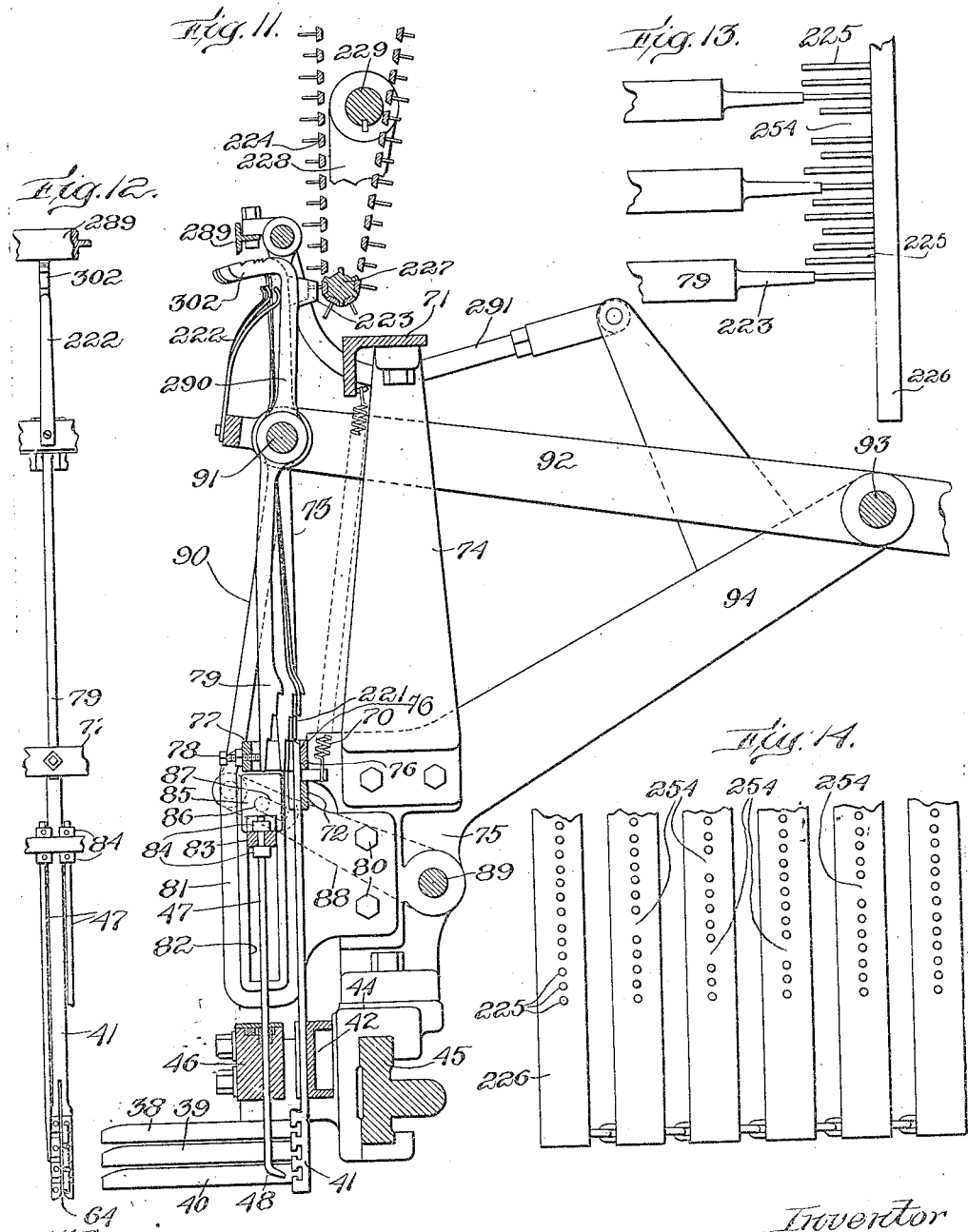

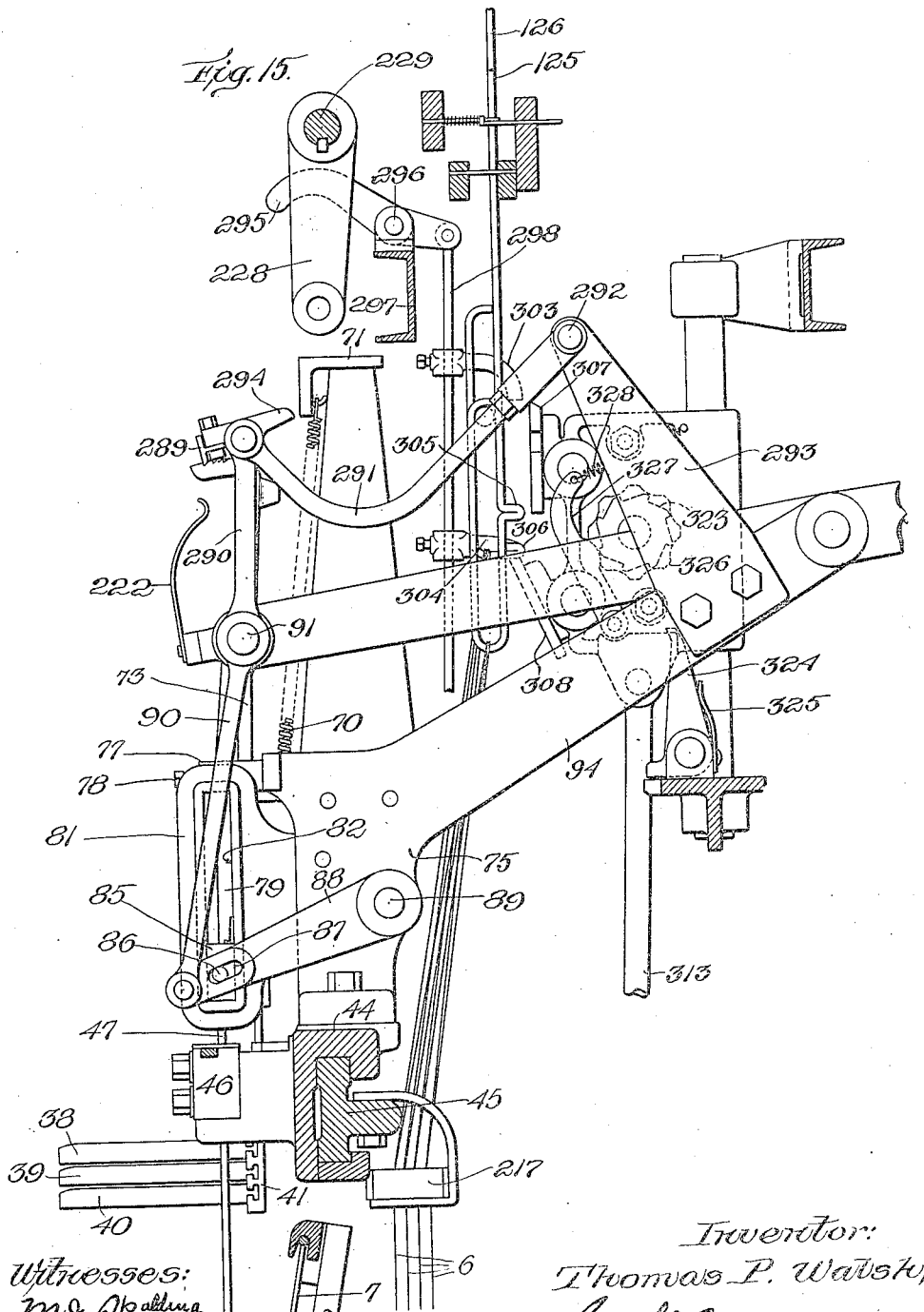

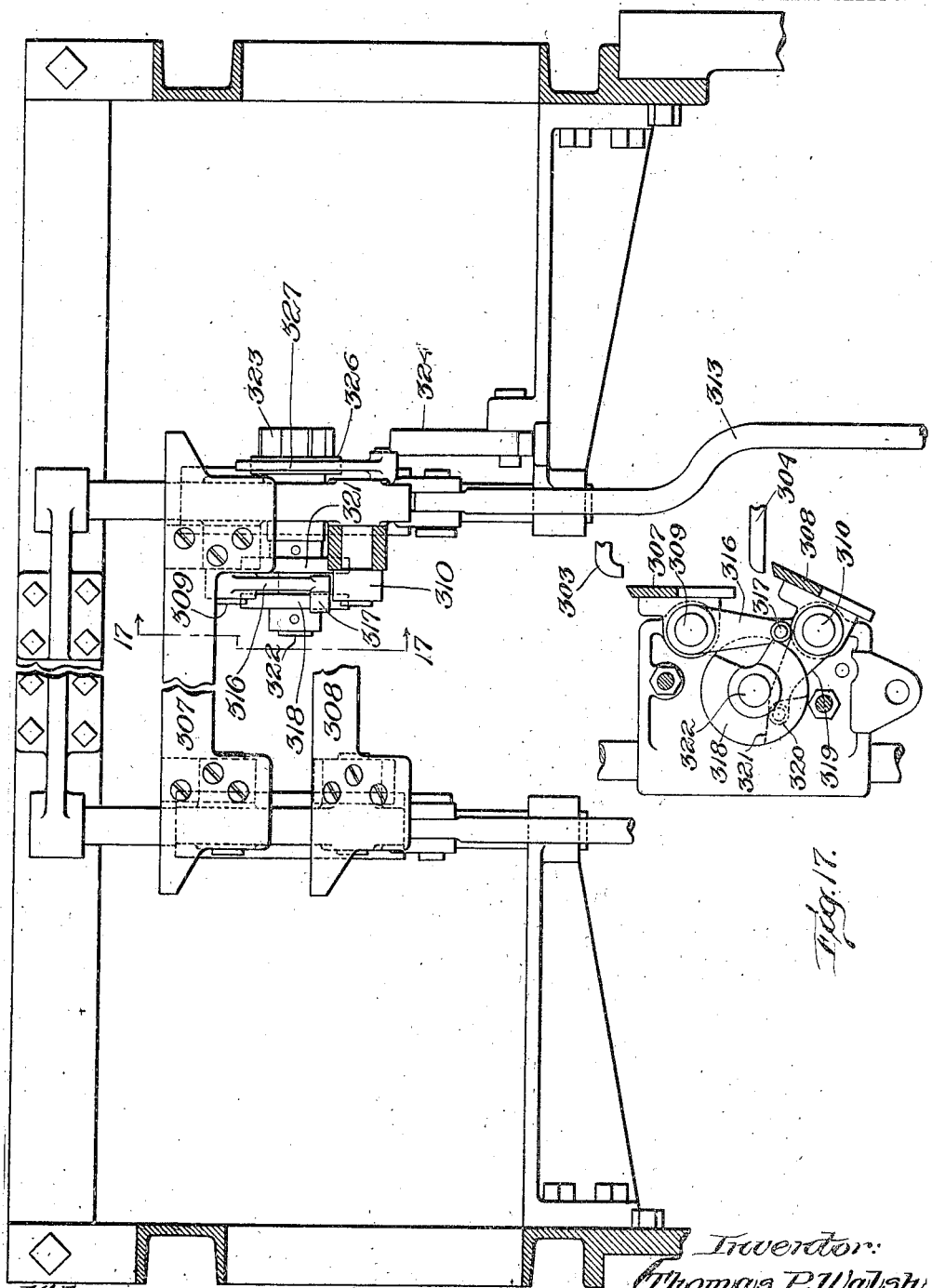

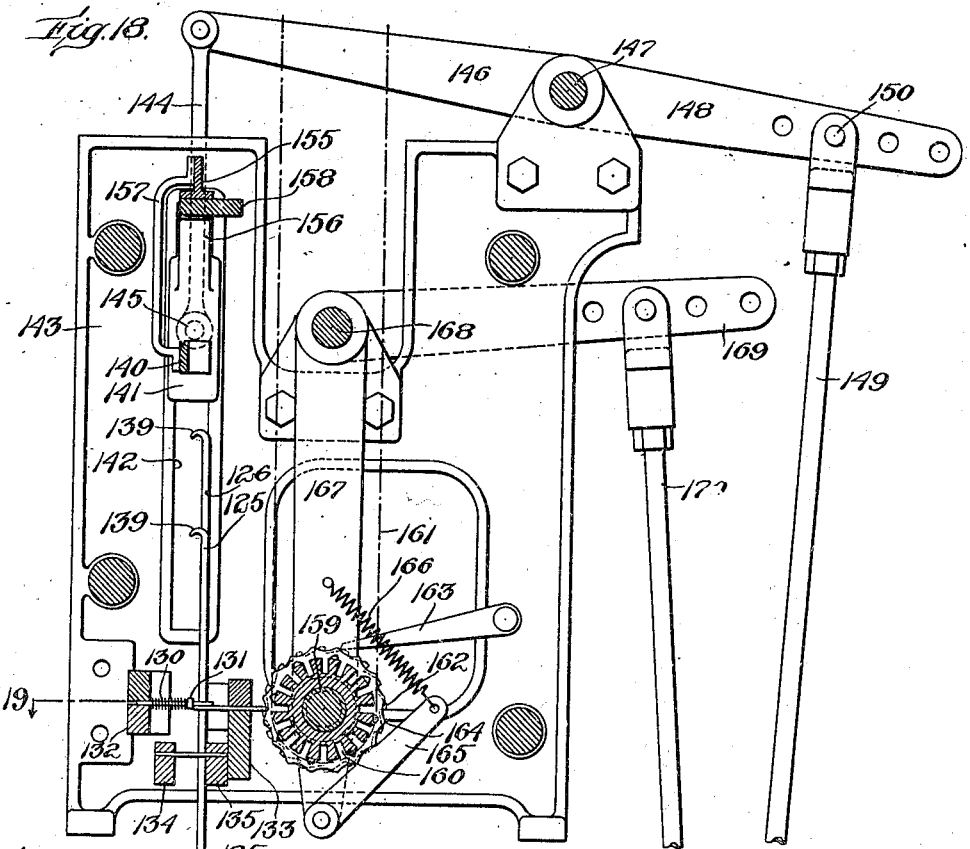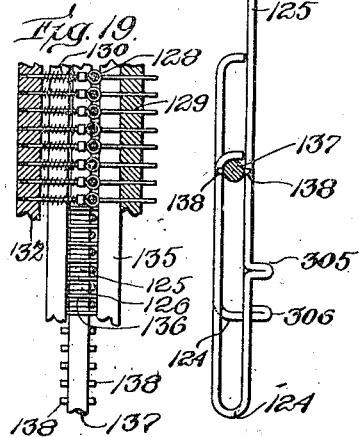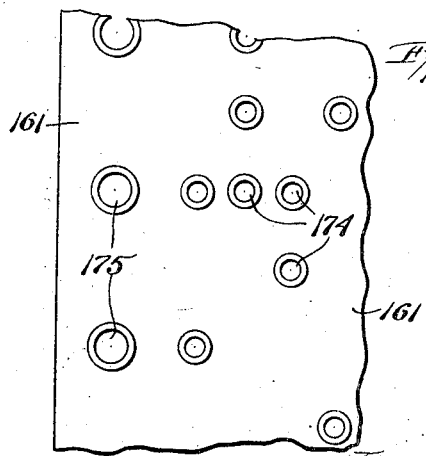

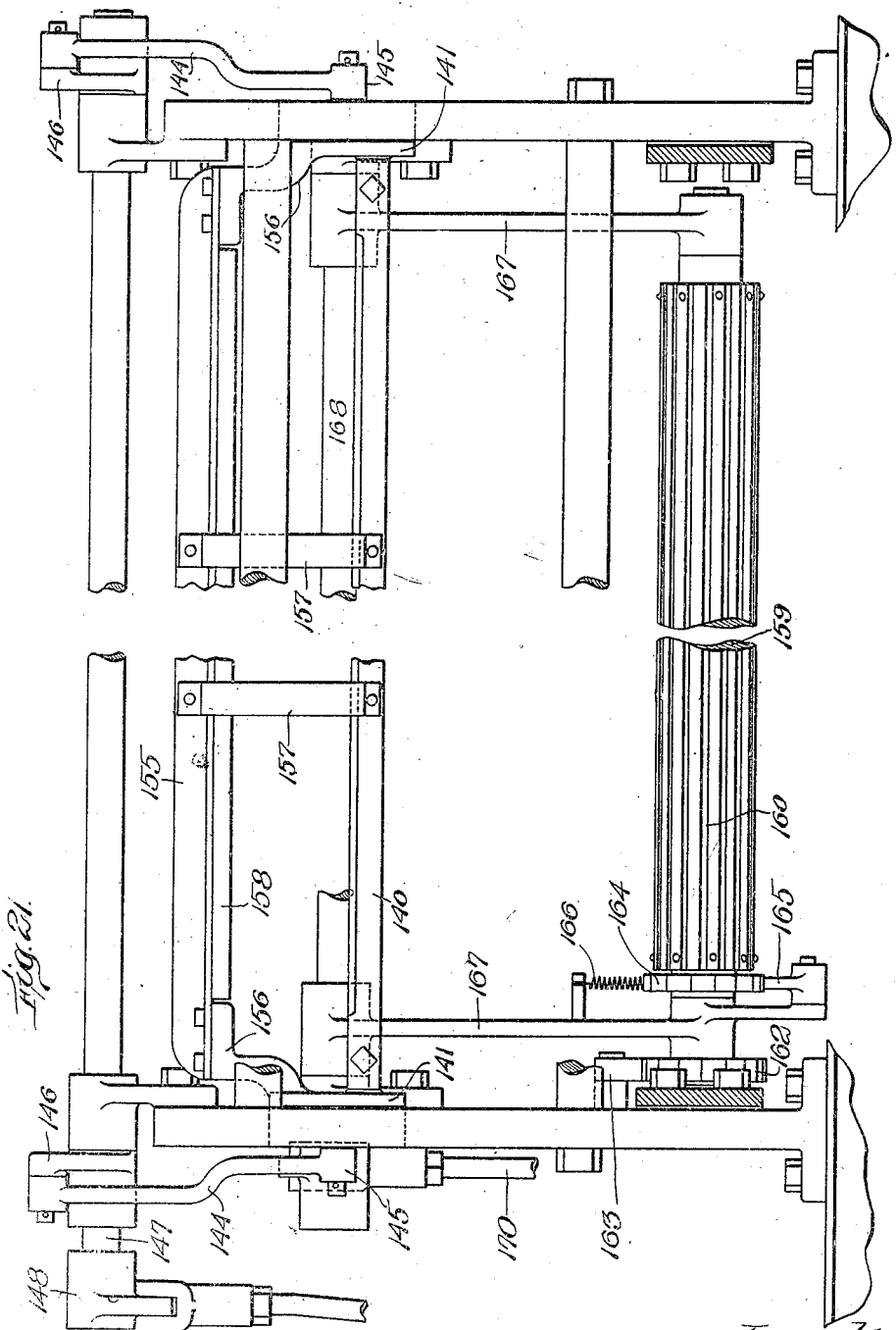

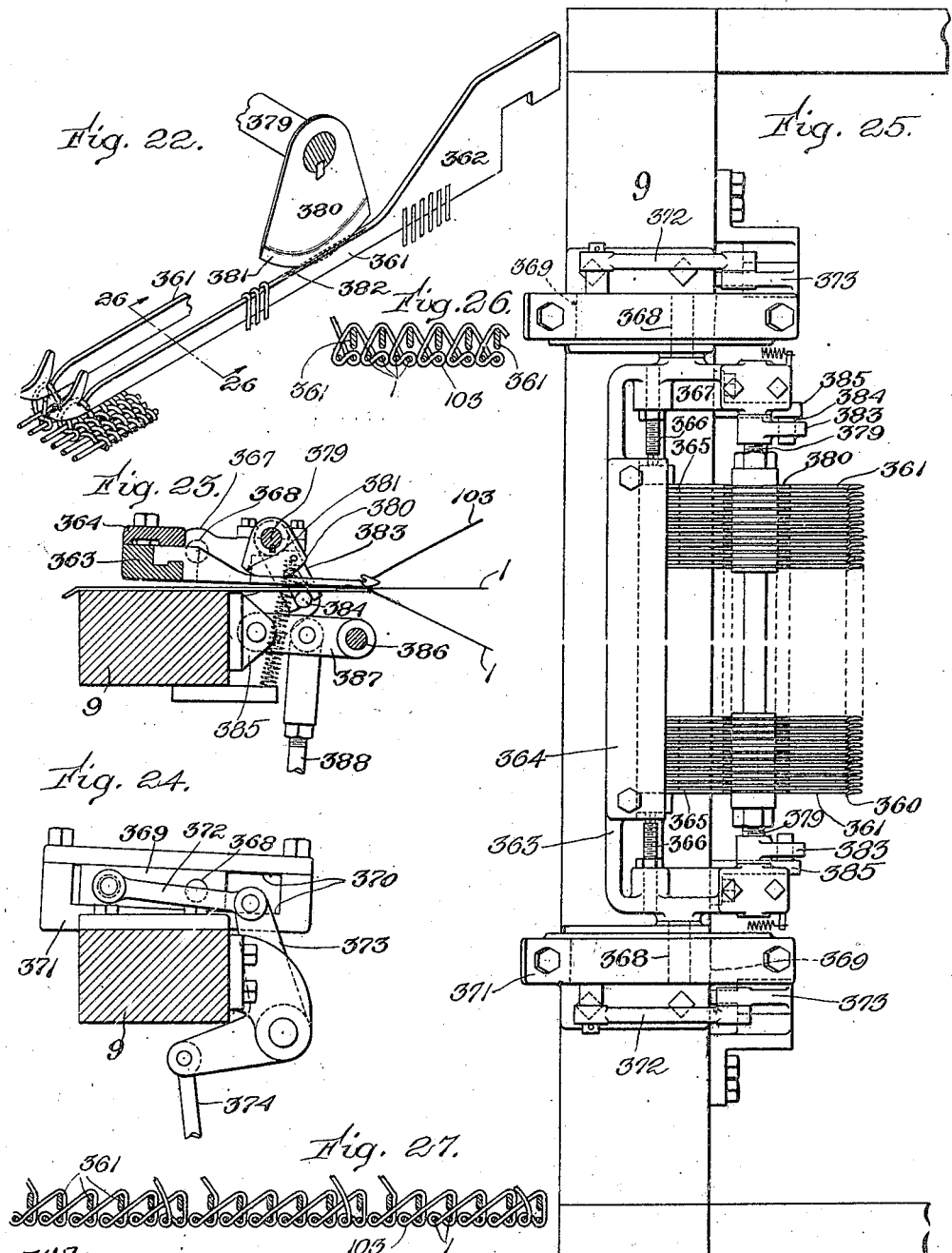

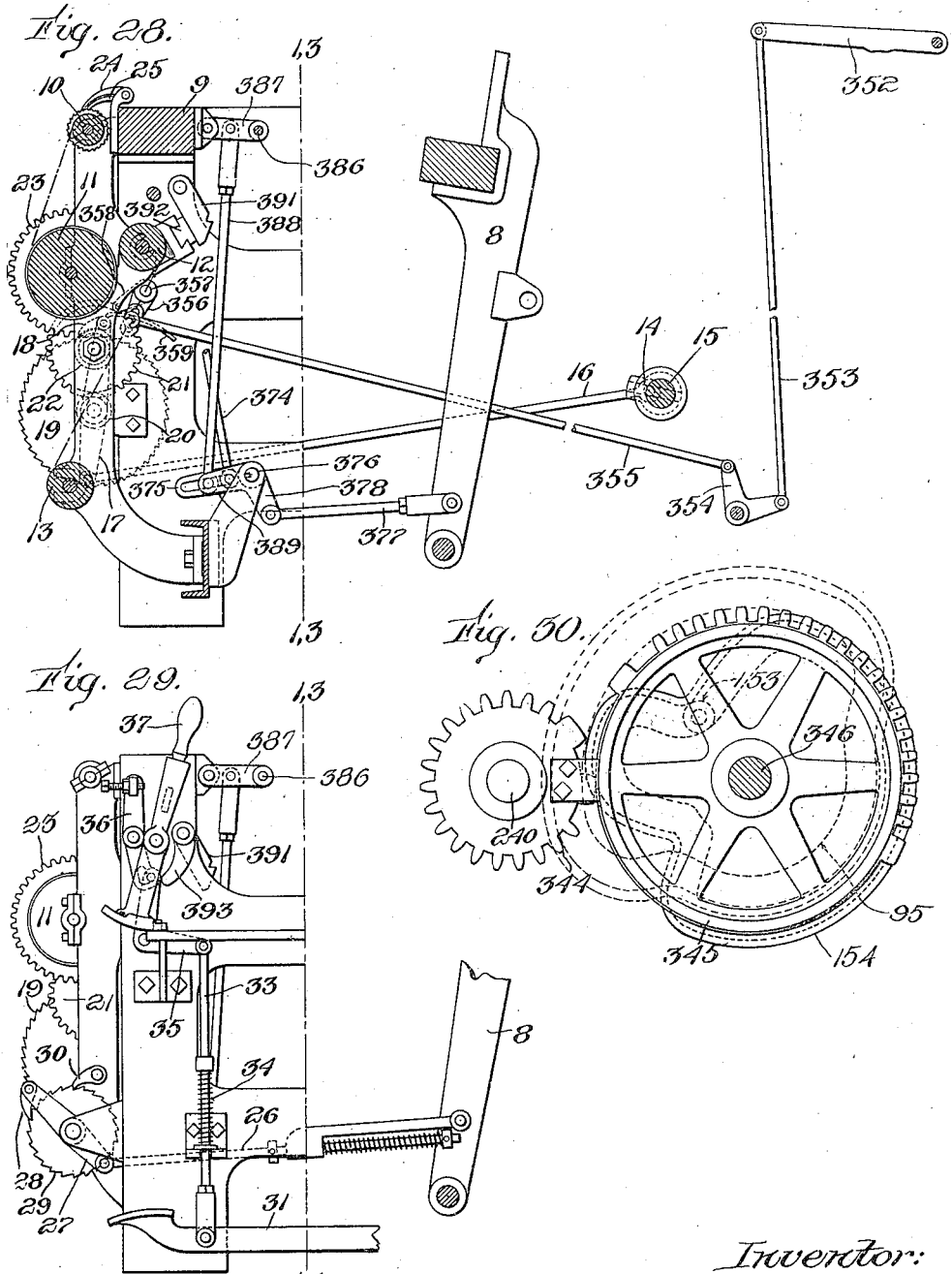

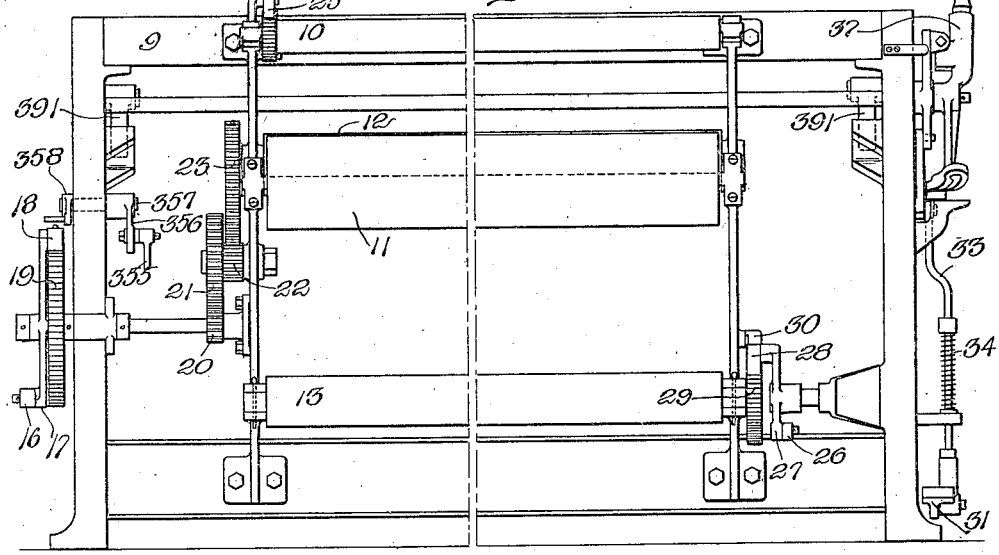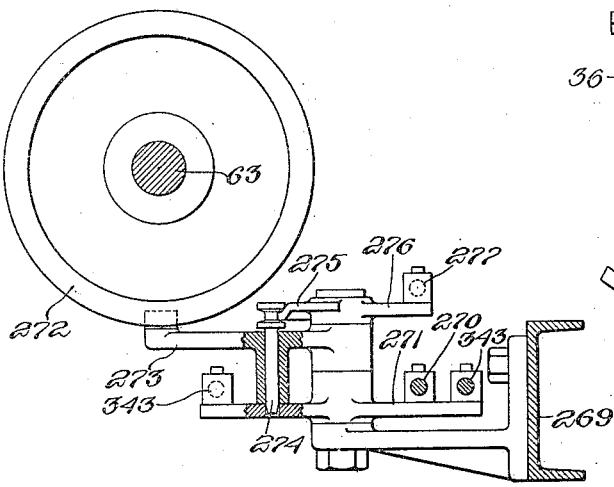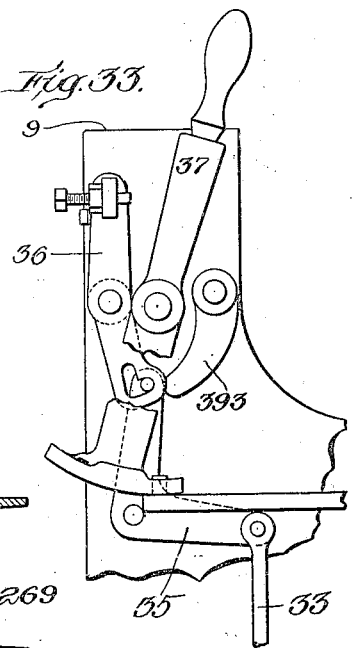

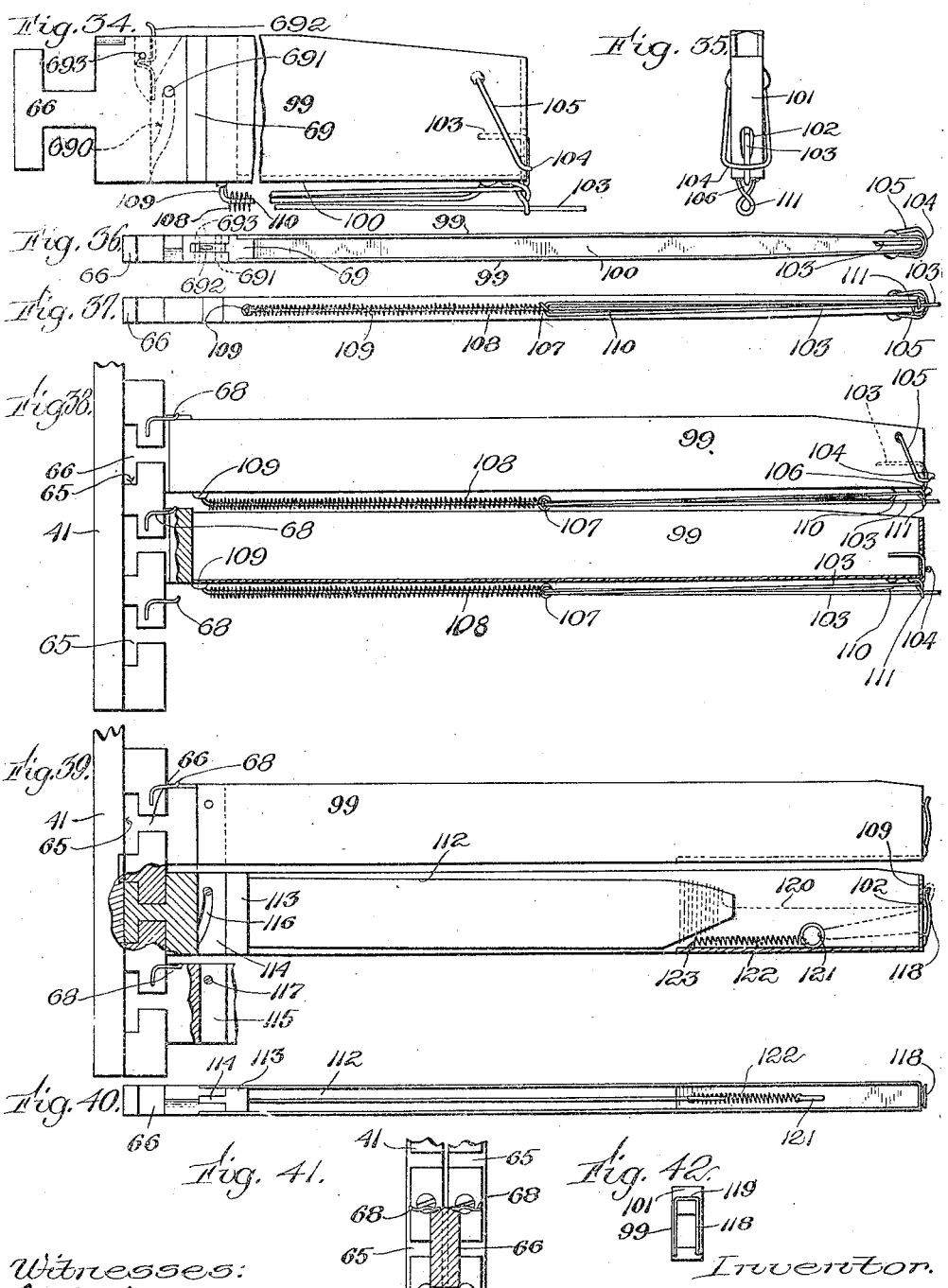

T. P. WALSH.
LOOM.
APPLICATION FILED FEB. 5, 1910.

1,069,651.

Patented Aug. 5, 1913.
18 SHEETS—SHEET 16.

Witnesses:
M. J. Spalding
Edward Maxwell

Inventor:
Thomas P. Walsh,
by Geo. St. Maxwell,
Attorney.

T. P. WALSH.
LOOM.
APPLICATION FILED FEB. 5, 1910.

1,069,651.

Patented Aug. 5, 1913.
18 SHEETS—SHEET 17.

Witnesses:
M. J. Spalding,
Edward Maxwell

Inventor:
Thomas P. Walsh,
by Geo. S. P. Maxwell,
Attorney.

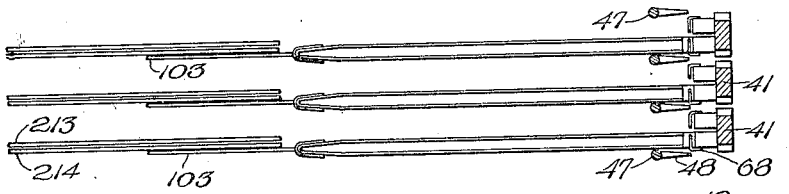
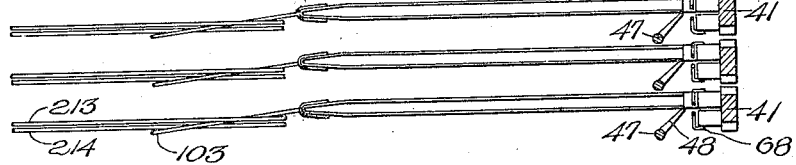
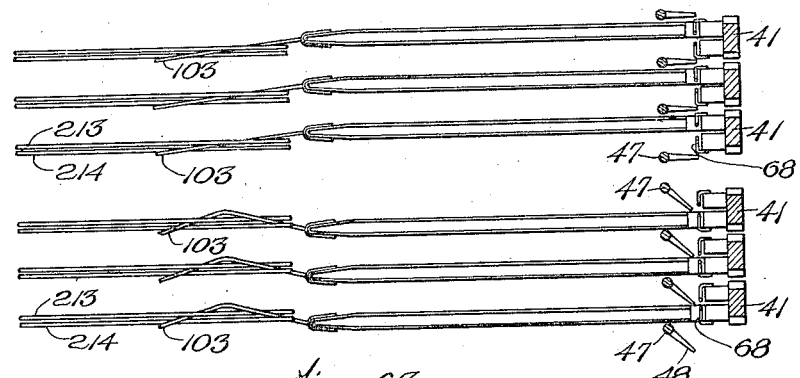
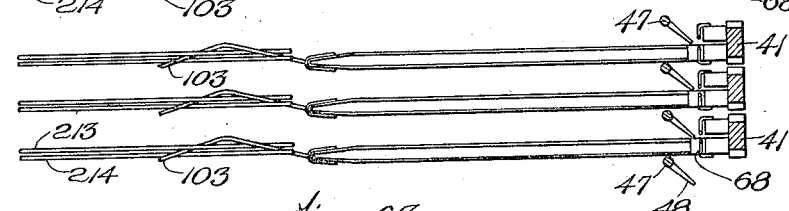
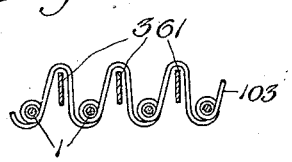
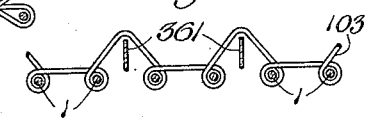
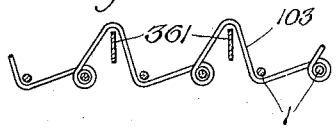
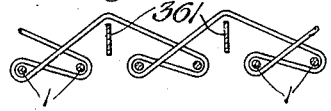

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

LOOM.

1,069,651.　　　Specification of Letters Patent.　　Patented Aug. 5, 1913.

Application filed February 5, 1910.　Serial No. 542,339.

*To all whom it may concern:*

Be it known that I, THOMAS P. WALSH, a citizen of the United States, and resident of Boston, in the county of Suffolk and State of Massachusetts, have invented an Improvement in Looms, of which the following description, in connection with the accompanying drawings, is a specification, like letters on the drawings representing like parts.

My present invention is a loom especially adapted to pattern weaving, and having for its principal objects the weaving of oriental rugs, tapestries, and a large variety of special fabrics, and the scope of the invention in this respect will be better understood from a brief enumeration of certain of the more distinguishing features of novelty and advantage which give importance to my invention.

Among the most important distinguishing features of my invention, I mention first the provision of means whereby a complete unitary fabric is woven in sections or a series of separate portions across the loom by a series of selective group shuttle weaving mechanisms preferably weaving simultaneously and capable together of accomplishing a continuous or homogeneous unbroken pattern weave from one edge of the fabric to the other edge thereof.

A further distinguishing feature, which gives my invention a wide range of service and adaptability to the making of a large variety of products, is that each of said series of weaving mechanisms is given a progressive weaving movement in its individual section of the fabric, or in other words the weaving in each section proceeds step by step.

I have embodied my invention in a loom in which the pattern weaving is accomplished by a series of sets or groups of small shuttles spaced at relatively close intervals across the loom, and among the further important features constituting my invention, in connection with said loom, I provide means to select any shuttle across the loom, means to weave in a series of colors across the loom according to a multi-color pattern, means to leave blank spaces or to weave segregated patterns either tufted or not, across the loom at will or according to pattern, all of which I consider broadly new irrespective of the kind of weave; and in connection with the above I have devised means whereby the above separately new features may be carried out by means which does the weaving in the form of oriental knots, this being an additional new and important feature.

Further features reside in providing said shuttle means to weave color-pattern weaving as stated across the loom so that all the warps are covered by said pattern weaving, means to shift the variously selected shuttles step by step across the loom so that an individual shuttle weaves in connection with a different plurality of warps at each step, the total result being that not only is a unitary color-pattern thereby rendered practicable, but a fabric of any width permitted by the size of the loom. These features also are new and important irrespective of the kind of weave, but my preferred form of loom provides means for accomplishing these results in connection with weaving oriental knots as stated. I provide means to tie a series of oriental knots in different colors on a single pick, means capable of weaving tapestry (or decorative fabric) by power wholly with a weft pattern.

My invention provides means to weave a tapestry (*e. g.* like a Gobelin tapestry) and yet have a regularly woven back, by which I mean a back made up of warps and binder threads united in plain weaving.

In its more complete preferred form, my invention is capable of pile weaving, and among the important features constituting my invention in this respect, are means to hook the piles on a pile wire and pull the loops taut therewith, means whereby the pile loop is pushed over the pile wire, means to maintain the pile strands loose while being hooked onto the pile wires, means whereby the pile wires and hooks move toward the lay when the lay beats up, thereby insuring certainty as well as facility of operation, means to cut the piles thus on the pile wires with a moving cutter, thereby insuring a clean as well as sure cut, a further feature residing in preferably rocking the pile wire lengthwise whereby it is not only moved but is given a dipping movement into the pile loop followed by said loop-pulling or knot-tightening movement.

My invention is further distinguished by providing a quick shedding movement for the relatively light pattern weaving and a slow (and preferably shorter) shedding movement for the relatively heavy binder weaving, thereby materially saving the loom and permitting fast work notwithstanding that the pattern may be intricate. Also, in connection with the pattern mechanism, I provide means for holding the pattern member stationary while the shuttles in a set or group of shuttles are being selected and operated under the control of the successive pattern-changing selective devices of a single bar or portion of said member, so that, if, for instance, said single bar or portion is provided with six selective devices (i. e. six pins, holes, or other well known devices such as are usually arranged in a line across a pattern chain, card, or so forth), six selections and shuttle reciprocations will take place for each such bar or portion of the chain or pattern member, before the latter is operated to bring another bar or portion in pattern-controlling position.

Other features of my invention, together with the operation and advantages thereof, will appear at length in the course of the following description of the invention, considered with reference to the accompanying drawings, in which I have presented a preferred embodiment of my invention designed to present clearly all the various features of the invention.

In the accompanying drawings, I have endeavored to show the mechanism so combined as to be capable of producing the various results mentioned in the description, but I wish it understood that when it is not required to produce all of said results, certain portions of the mechanism may be omitted while still carrying out the remaining features of the invention.

Figure 44:
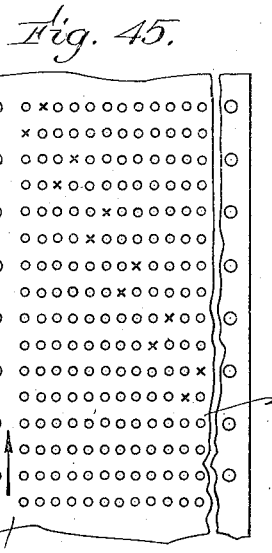
Figure 45:
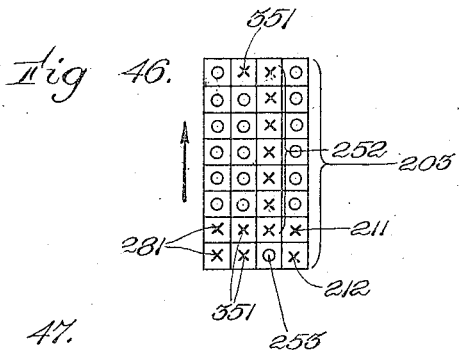
Figure 46:
Figure 47:
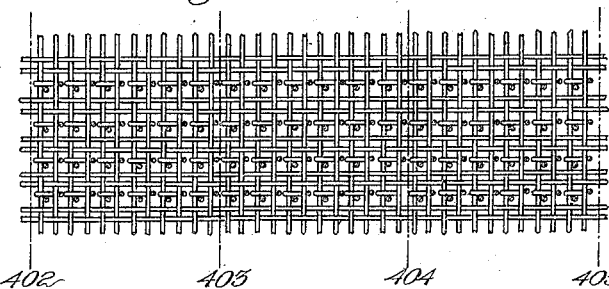
Figure 56:
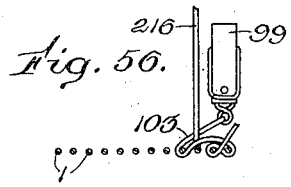
Figure 57:
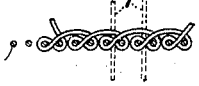

In the drawings, Figures 1 and 3 are views of the loom in vertical section showing the main portions of the weaving mechanism in front elevation, said views showing respectively the opposite end portions of the loom and being taken on the line 1, 3—1, 3 of Figs. 28 and 29; Fig. 2 is a transverse sectional detail of a portion of the means for moving the weaving mechanism step by step; Fig. 4 is a vertical longitudinal sectional view of the main portion of the loom; Fig. 5 is a plan view of a portion of the controlling mechanism which governs the movement of the step-by-step mechanism, pattern-chain mechanism, take-up and picking mechanism; Fig. 6 is a view in side elevation of the driving end of the loom shown in Fig. 4; Fig. 7 is a top plan view partly broken away of a portion of the pattern-chain operating mechanism; Fig. 8 is a top plan view of the lower portion of the driving end of the loom, the upper portion and certain parts being broken away for clearness of illustration; Fig. 9 is a vertical longitudinal sectional view of the shuttle-controlling mechanism, shedding mechanism and adjacent parts; Fig. 10 is a horizontal sectional view showing in plan the rack and pinion movement and adjacent portions of the shuttle-operating mechanism; Fig. 11 is a vertical longitudinal sectional detail of the shuttle mechanism and a portion of the pattern mechanism; Fig. 12 is a view in front elevation of one set or group of shuttles and adjacent parts shown in Fig. 11; Fig. 13 is an enlarged fragmentary plan view of one bar or portion of the pattern chain in operative relation to three selectors; Fig. 14 is an enlarged detail in front elevation of a portion of the pattern chain: Fig. 15 is a view similar to Fig. 11 showing a portion of the shedding mechanism for the fly shuttle; Fig. 16 is a vertical sectional view showing in front elevation a portion of the shedding mechanism shown in Fig. 15; Fig. 17 is a transverse sectional view taken on the line 17—17, Fig. 16; Fig. 18 is a vertical longitudinal sectional view of the head of the loom showing a portion of the shedding mechanism for the pattern shuttles; Fig. 19 shows in top plan approximately on the line 19, Fig. 18, details of the indicator wires and guides for the lifter wires; Fig. 20 is an enlarged detail in plan of the card or pattern chain for controlling the shedding; Fig. 21 is a view in front elevation of the upper portion of the mechanism shown in Fig. 18; Fig. 22 is a perspective view looking from the rear toward the front of the loom showing a detail of the pile wires, hooks, and cutting means; Fig. 23 is a transverse vertical sectional view through the breast beam and adjacent parts showing further details of the pile-forming mechanism; Fig. 24 is a similar sectional view showing a portion of the pile-forming mechanism in side elevation; Fig. 25 is a top plan view of the breast beam and pile-forming mechanism mounted thereon; Fig. 26 is a transverse sectional view through a series of the pile wires showing the relation thereof to the weaving, and showing the formation of the oriental knots, said view being taken on the line 26—26 of Fig. 22 looking toward the front of the loom; Fig. 27 is a view similar to Fig. 26 looking in the opposite direction, toward the rear end of the loom, and showing the weaving spread out so as to render more clear the arrangement of the threads with relation to the pile wires, and the relation of the sections of the weaving to each other; Fig. 28 is a central vertical sectional view similar to Fig. 4 of the front end of the loom showing the take-up mechanism; Fig. 29 is a view thereof in side elevation; Fig. 30 is a view in side elevation of the mutilated gears which drive the crank shaft; Fig. 31 shows the front of the loom in front elevation, the pile-forming mechanism being omitted;

Fig. 32 is a transverse sectional view showing in side elevation the controlling mechanism of the picking apparatus; Fig. 33 is a broken detail in side elevation of the shipping mechanism, etc.; Figs. 34–38 are views of the shuttle for carrying a cop, and Figs. 39–42 of a shuttle for carrying a bobbin or spindle, in which Fig. 34 shows the shuttle in side elevation, parts being broken away; Fig. 35 shows said shuttle in right hand end elevation; Fig. 36 is a top plan view of said shuttle; Fig. 37 is a bottom plan view of the shuttle; Fig. 38 is a view in side elevation of two shuttles in operative position in a shuttle carrier, parts being broken away and sectioned for clearness of illustration; Fig. 39 is a view similar to Fig. 38 showing three bobbin-carrying shuttles in supported relation to a carrier, parts being broken away; Fig. 40 is a top plan view of one of said shuttles; Fig. 41 is a transverse vertical sectional view showing the bottom end of the carrier and the adjacent guided end of a shuttle; Fig. 42 is a view in outer end elevation of this latter shuttle; Fig. 43 shows in side elevation the forward portion of a shuttle, illustrating the relation thereof to the weaving at the time of the beating-up operation and illustrating the tightening of the pattern yarn by the hand rail and the engagement thereof by the pile wire hook, the weaving position of the reed being indicated in dotted lines; Fig. 44 is a schematic view to make clear the arrangement of the heddles with relation to the lifter wires, shuttles, etc.; Fig. 45 is a plan view or rather diagram of one complete division of the controller card for controlling the shedding mechanism; Fig. 46 is a plan view, or rather diagrammatic view, of one complete division of the controlling chain; Fig. 47 is a diagrammatic or partial plan view showing in three sections one form of weave accomplished by my loom, this view showing the same when weaving the Persian knot; Figs. 48–56 are diagrammatic views, partly in vertical section across the loom, looking at the end of a shuttle, showing the successive movements of the warp threads and pattern threads, Figs. 48–52 showing the same in connection with three sections of the loom, and Figs. 53–56 showing one section only; Fig. 57 is a similar view of the pattern weaving when the pile formation is omitted; Figs. 58–61 are diagrammatic views, partly in horizontal section, showing the successive movements represented in Figs. 48–51, i. e. one complete cycle of movements; Figs. 62, 63, and 64 represent further different knots that can be woven with the loom, the former showing the Savonnerie knot and the latter two the Indian knot; and Figs. 65 and 66 show different ways of making the Persian knot, showing a different order of lifting the warp threads and the latter an arrangement so as to make a longer pile than shown in Figs. 26 and 27.

The warp threads 1 are delivered from a warp beam 2 mounted at the rear end of the loom frame 3 in usual manner, passing over a back roll or whip roll 4 to lease rods 5, through the eyes of heddles 6 and thence forward through a reed 7 of a lay 8 to a breast beam 9 over a guard roll 10, take-up roll 11, guide roll 12 to a cloth roll 13. The take up roll is driven by a cup crank 14 on the left hand end of the picking shaft 15 which actuates a connecting rod 16 pivoted to the lower end of a lever 17 whose upper end carries a pawl 18 engaging a ratchet wheel 19 on whose shaft is a pinion 20 in mesh with a gear 21 whose shaft carries a pinion 22 in mesh with a gear 23 fast on the take-up roll 11. Pawls 24, 25 hold the guard roll 10 against backward movement. The cloth roll is actuated from the lay sword (Fig. 29) by a give-away connector 26, lever 27, pawl 28, and ratchet 29, a pawl 30 holding against backward movement. A brake lever 31 operates a brake band 32 (Fig. 6), said brake lever being connected by a rod 33 normally held upward by a spring 34 to a bell crank 35 and locking lever 36 adjacent the shipper handle 37. All of the foregoing construction may be of any usual or preferred kind, and hence need not be further referred to or explained.

As herein shown, the fabric is made by weaving in two binder threads, one row of knots, two binder threads, another row of knots, and so on, or in other words each pick of pattern yarn (irrespective of whether it is woven in the form of knots or otherwise) is embraced by a pick and return of the binder thread, although my invention is not restricted to this arrangement, said order of weaving being preferred as it conforms to the rule followed in weaving oriental rugs or carpets. Also, as already stated, in the present preferred embodiment of my invention, the pattern weaving is accomplished by a series of sets or groups of small shuttles spaced at relatively close intervals across the loom. For convenience of illustration and description, I have shown these sets or groups of shuttles as composed of three shuttles and hence three colors each, and it will be understood that any desired number of colors may be employed according to the intricacy or range of patterns for which the loom is built, one of the important advantages of my invention being that it permits an almost endless variety in this respect. Each set or group of shuttles 38, 39, 40 is herein shown as mounted in a carrier 41, said carriers being supported in a transverse carrier bar 42 to move vertically in guideways 43 therein, said bars being supported at their ends on slide brackets 44 mounted to slide transversely of the loom on a transverse guide beam 45. The end brackets 44 project forwardly beyond the bars 42 and support a parallel bar 46 in which are vertically mounted shuttle shifters 47. These shuttle shifters are located in longitudinal alinement between successive shuttle carriers and extend downwardly between adjacent groups of shuttles, terminating at their lower ends in thin rearwardly projecting fingers 48 which extend as close as practicable to the butt end or extreme rear end of the shuttles and have a swinging movement, as shown clearly in Figs. 58–61 for shifting the shuttles of adjacent groups back and forth in the weaving operation. This swinging movement is imparted to the shuttle shifters by rocking their vertical spindles or uprights, which for this purpose are provided with toothed pinions 49 engaged by a rack bar 50 seated in a guideway formed therefor in the top of the bar 46 and held in place by a removable cap 51. This rack bar 50 is actuated by a finger or rocker lever 52 (Figs. 3, 6) whose shaft 53 is rocked by an arm 54 in whose slotted end is adjustably secured at 55 the upper end of a rod 56 pivoted to swing transversely of the loom at 57 and pivoted at right angles thereto at 58, Figs. 3 and 8, to a cam lever 59. The lever 59 is pivoted on a stud at 60 and has a cam roll 61 actuated by a cam 62 on the bottom shaft 63. This mechanism gives each weaving pattern shuttle a back and forth weaving movement in coöperation with the desired number of warp threads, the loom being arranged and timed herein for weaving a Persian knot, and hence it will be understood that the further description is with reference to this particular embodiment for accomplishing the pattern weaving with the Persian knot. The shuttle carriers are placed side by side across the width of the loom, a convenient arrangement and size being sixty four shuttle carriers in a forty-eight inch weaving space, and sixty five coöperating shuttle shifters. The shape and construction of the shuttle carrier is best shown in Figs. 9–12, 39, and 41, from which it will be seen that each carrier has a relatively long slender upwardly projecting stem terminating at its lower end in a preferably slightly broader portion having a central vertical thread slot 64 and transverse T slots 65 across its face for the T-shaped heads 66, or shuttle holders for the shuttles, to slide in from one side of the shuttle carrier to the other, the holder head 66 of the shuttle being indicated in Fig. 41 half-way across in its travel, and in Fig. 12 all three shuttles are shown in their extreme right hand position, corresponding to the position in Figs. 58 and 61, while in Figs. 59 and 60 the shuttles are shown in their left hand position. At its lower end the thread slot 64 is flared, as indicated at 67, Fig. 41, to give ease and precision of movement to the warp thread which is raised thereinto by the shedding mechanism.

To prevent accidental movement of the shuttles in the transverse ways or slots 65 of the shuttle carriers, I provide light springs 68 in position to overhang the top edge of the holder head 66, said head being beveled or provided with a central apex and the springs properly crimped, all as shown clearly in Fig. 41, so as to permit the free movement of the shuttle and yet tend to hold said shuttle against accidental movement from either of its extreme positions. The wires 68 are soldered or otherwise secured to the shuttle carriers preferably at the sides, see Figs. 58–61.

In my preferred form of shuttle, the shuttle terminates in a tongue shaped block or butt end 69 arranged to fit a complemental shape in the front end of the holder head 66, said tongue having a slot 690 to fit over a transverse pin 691 in the head, see Figs. 34, 36, 37, and normally retained in place by a spring clip 692 carried by said tongue to engage a pin 693 on the holder head. Many advantages result from this construction, as for instance the shuttles may be renewed rapidly, but its principal advantage is in facilitating a wide range of special pattern work. For instance, the groups of shuttles as herein shown are limited to three shuttles each, but, by this construction of shuttle holder or quick detaching and securing means for the shuttle, a figure may be woven in the pattern at any place with practically any variety of colors simply by quickly snapping into place the shuttle or shuttles containing the extra colors required for the particular limited spot or portion of the pattern over and above the complement of colors carried by the regular group of shuttles. A further advantage, from a practical standpoint, is that by this invention, one and the same head 66, which is strong, accurate, certain, non-binding, broad-bearing and smooth-moving, always coöperates with its particular bearing or slide-way 65, thereby permitting and insuring a much smoother operation than would be practicable if each shuttle had its own head 66. A further advantage is that the shuttle proper is removed from the head without any lateral movement, the simple upward movement (i. e. transversely of its T-slot guideway) being readily accomplished without interfering with any of the adjacent parts. It will be understood that the particular form of the head and the particular means of detachably securing the shuttle to the head may be varied, a single tongue, for instance, and a single slot being preferred in the extremely narrow shuttle herein contemplated, but the construction not being limited thereto, and in fact a repetition or reversal of this construction being preferred for heavier weaving. I have herein shown several arrangements of shuttles which will presently be described. Each shuttle carrier is provided at the rear side of its upper end with a rearwardly projecting lifting pin normally held upward by a spring 70 secured at its lower end to said pin and at its upper end secured to a hook or pin, Fig. 11, on the under side of a transverse angle iron 71. A safety lifter-bar 72 operated by links 73 positively raises the carriers 41 in case a spring 70 fails. The angle iron 71 is supported at its opposite ends on plates 74 extending rigidly up from brackets 75 secured at their lower ends to the slides 44. Mounted on the upper ends and front face of the brackets 75 is a transverse frame whose rear bar 76 acts as a guide for the upper ends of the shuttle carriers and as a stop for their upward movement, and whose front bar 77 is provided with a series of adjustable stops 78 for the shuttle selectors or pushers or actuators 79. Bolted at 80 to the brackets 75 are forwardly projecting ears or guide plates 81 provided with guideways 82 for guiding a lifter bar 83 in which all the shuttle shifters 47 are mounted to rotate but held against other movement by stops 84. This lifter bar 83 has upturned ends 85 each provided with an outwardly projecting pin 86 extending into a slot 87 in a lever 88 pivoted at 89 to the bracket 75 and at its forward end pivoted to a link 90 pivoted on a shaft 91 carried in the free ends of levers 92 pivoted at 93 to rearwardly projecting arms 94 of the brackets 75 and actuated by cams 95, levers 96 pivoted at 97 to the frame and connected by links 98 to the rear ends of the levers 92. This mechanism is for the purpose of lifting the shuttle shifters 47 during the beating-up operation and lowering them for the weaving operations.

As already stated, one of the important elements or features of my invention which makes it possible, with my loom, to weave an oriental rug or other fine fabric is the special shuttle manipulating or operating mechanism. The shuttles are shown in full size in Figs. 36–42 and enlarged in Figs. 34 and 35. The holder head 66 is T-shaped in order to facilitate the mounting of the same in the carrier 41 and permit free and yet accurately directed sliding movement of the shuttle in the transverse ways 65 of said carrier. Thin longitudinal shuttle sides 99, preferably made by bending a piece of metal into a narrow U-shape, are soldered or otherwise secured to the block or butt end 69, as shown in the preferred construction, Figs. 34–37, or directly to the holder head 66, as shown in Figs. 38, 39. In the form of shuttle shown in Figs. 34–38, the shuttle is provided with a bottom 100, this being the form preferred when weaving with a cop. In the outer end 101 is a hole or thread-eye 102 through which the thread or yarn 103 is led under the forward loop 104 of a tension spring 105 which is soldered or otherwise secured to the sides of the shuttle, said thread thence passing through an upper eye 106 of an 8-shaped wire guide back through a glass eye or ring 107 carried at the outer end of a take-up spring 108 which is fast at its rear end at 109 and mounted to slide on a guide wire 110 which extends lengthwise under the shuttle and is soldered at its opposite ends to the bottom thereof adjacent the opposite ends of the shuttle. The thread or yarn 103 passes from the glass eye or ring 107 out through the lower guide-eye 111 of the 8-shaped guide.

In Figs. 39, 40 I have shown a shuttle for carrying a spindle or bobbin, the latter consisting of a thin strip 112, preferably of metal, having a rear guide end 113 whose tongue 114 fits in a groove 115 provided therefor in the shuttle, and has a slot 116 to fit over a transverse pin 117 in the shuttle, said slot being curved to pull the bobbin into snugly alined and properly held position as clearly shown in Figs. 39 and 40. The shuttle has a head 66 and sides 99 the same as before, and in front of the thread-eye 102 thereof is a U-shaped tension spring and guide 118 over the top 119 of whose loop the thread 120 from the bobbin is carried and thence brought over outward and back into the shuttle and through a glass ring 121 and thence straight out from the shuttle, said glass eye or ring 121 being carried at the outer end of a tension spring 122 which is secured at 123 to any convenient part of the shuttle. The take-up springs are provided for the purpose of keeping the yarn taut, yielding forward to the pull of the lay, as best shown in Fig. 43, and pulling back on the yarn when the lay moves away from the fell. When the lay is in its full line position, Fig. 43, the yarn is suddenly pulled forward at each shuttle and thereby the spring 108 is pulled forward, as shown in said figure. When the lay moves back, the spring 108 immediately pulls the yarn into its dotted line position, thereby improving the weaving and also performing an important function in facilitating the certainty of the yarn being hooked properly by the pile wires, as will presently be described. The kind of knot or weave produced by the pattern weaving mechanism depends upon the particular warp thread or threads lifted and the order of their lifting, and in the machine of the drawings this shedding or lifting movement of the warp threads is produced by a warp selective mechanism best shown in Figs. 4, 18–21. I prefer to support the warps in heddles is usual manner, the heddle cords being secured at their upper ends to the lower loop ends 124 of lifter wires 125, 126, said cords being held taut by being weighted at their lower ends by usual lingoes 127. Each lifter wire passes through the coil or eye 128 of an indicating wire 129 normally held back by a spring 130 which bears against a collar 131 at its rear end and against a guide plate 132 at its forward end. The opposite ends of the indicating wires are guided in holes in the plate 132 and an opposite plate 133. Below these plates are other plates 134, 135 in which are mounted transverse guide bars or pins 136, and in the loops at the lower ends of the lifter wires is a heavy stationary wire or transverse rod 137 provided with guide pins 138. This stationary rod and its pins, and the guide pins 136, coöperate with the guide eyes 128 of the indicator wires to maintain the lifter wires 125, 126 always in exactly the required position. At their upper ends the lifter wires are provided with hooks 139 to be engaged as required by a lifting knife 140 which extends across the machine from slides 141 arranged to travel in guideways 142 in the head frame 143 of the loom. The slides 141 which carry the lifter knife 140 are raised and lowered by links 144 pivoted to the ends thereof at 145 and actuated by levers 146 extending rigidly from a rock shaft 147 rocked by a lever 148 and rod 149 adjustably secured to said lever 148 at 150, said rod 149 being actuated by a T-shaped lever 151, see Fig. 4, pivoted to the frame of the loom at 152 and having its cam roll 153 actuated by a cam 154. Above the lifter knife 140 at a suitable distance is a transverse beam or angle iron 155, herein shown as supported by end brackets 156 and intermediate braces 157 to whose lower side is secured a safety device in the form of a striker or pusher 158 to strike gently against the upper ends of any lifter wires which might accidentally remain up when they should drop down. The member 158 is preferably wooden in order to prevent injuring the hooked ends of said wires. The cam 154 is so timed that it causes the lifter wires to raise up the selected warp threads at the same time that the selected shuttle carriers are being pushed down into weaving position, and to dwell in said position while the selected shuttles are being driven under said raised warp threads. The controlling mechanism which governs the selection of the warp threads may be of any usual or preferred kind, being herein shown as somewhat like a jacquard, comprising a cylinder 159 provided with a series of flutings or grooves 160 extending lengthwise thereof to receive those indicator wires 129 whose lifter wires are not selected, while the selected wires are pushed to the left, Fig. 18, so as to bring their hooked ends into the path of the lowered lifter knife 140 when the latter rises, thereby lifting said wires and with them the selected warp threads: To govern this operation, a pattern chain or web 161 coöperates with said cylinder in well known manner, the cylinder being provided with a ratchet wheel 162 engaged by a stationary pawl 163. A dwell or locking wheel 164 is mounted next to the ratchet wheel, to be engaged by a dwell lever 165 normally held against the same by a spring 166. The cylinder is journaled in the lower ends of levers 167 rigidly secured at their upper ends to a rock shaft 168 actuated by a crank 169 to which is adjustably secured a rod 170 whose lever 171, see Fig. 4, is pivoted at 97 to the frame of the loom and provided with a cam roll 172 actuated by a cam 173. In Fig. 20 a portion of the pattern web 161 is shown, illustrating its general construction, the holes 174 permitting the passage of the wires 129, and the holes 175 being provided for feeding purposes in well known manner.

This brings me to a further feature which I consider the most important single feature of my invention, viz. the step by step or progressive transverse intact weft weaving whereby, not only is it made practicable to weave oriental or other peculiar or preferred kinds of individual knots with shuttles or like-moving means in connection with pairs or other segregated numbers of warp threads, but the weaving thus of an integral pattern fabric entirely across the loom is made possible, and especially so in connection with colors. The bars 42, 46 and brackets 75 which carry the shuttle mechanism are mounted by means of slides 44 to reciprocate on the transverse guide beam 45, being reciprocated by a connector 176 pivoted at 177 to the left hand slide 44, see Fig. 1, and provided with a cam roll 178 traveling in the heart cam 179 of a cam wheel 180 fast on whose shaft 181 is a ratchet wheel 182 engaged by a pawl 183 pivotally mounted at the free end of a pawl arm 184 and held forward by a spring 185, said arm being actuated by a connector 186, see also Fig. 4, swiveled at 187 to a cam lever 188 actuated by a cam 189 on the shaft 63 and normally held upwardly by a spring 190. A hold pawl 191 prevents back movement of the ratchet wheel 182. The pawl 183, as herein shown, is given a quarter swing each time, and is controlled by a controlling segment 192 which bears against a pin 193, see Fig. 2, on said pawl and is actuated by a rod 194 swiveled at 195 to a lever 196 whose shaft 197 carries a lever 198 to which is adjustably secured a rod 199 actuated by a bell crank 200 connected by a link 201 to a lever 202 governed by a controlling chain 203, which works in connection with the pattern control. This chain is actuated by a bell crank 204, pawl 205, ratchet 206, link 207, lever 208 and cam 209. The lever 196 is held upward by a spring 210. The teeth of the ratchet 182 preferably correspond directly or in multiple to the number of warp threads per inch or other unit.

The foregoing mechanism coöperates with the pattern-shedding or warp-thread control and with the shuttle-operating mechanism previously described, to weave the selected pattern weft thread of each shuttle carrier with the warp thread or threads which are raised to coöperate therewith, this taking place similarly and simultaneously in connection with all the shuttle carriers entirely across the loom, and then the ratchet and pawl mechanism 182, 183 operates to shift all of said shuttle carriers one step, whereupon the operation is repeated with another set of warp threads, each selected shuttle weaving in a knot of pattern weft with the next selected warp thread or threads (as determined by the pattern chain or web 161). This operation is repeated step by step as said ratchet and pawl mechanism shifts the entire bank of shuttle carriers until the entire fabric is woven as an integral whole with a single pattern. In order that this part of the invention may be more clearly understood and the far reaching advantages thereof better apprehended, it may be well to refer to the more specific illustration before mentioned. If weaving a rug having sixty four knots to the square inch, i. e. eight linear knots, or six in a distance of three quarters of an inch, said knots being of the character of Persian knots (see Fig. 57) the ratchet 182 will be operated two teeth at a time, and hence will be stepped along six times, the shuttle of a given shuttle carrier being operated once forward and back during each halt of the carrier, and thereby each time completing a knot, and weaving the required six knots in the course of said six steps or ratchet movements. As the entire traverse of the shuttle carriers, in the concrete illustration being used, is three quarters of an inch, and as the above six steps or ratchet movements take place simultaneously throughout the entire width of the loom, it follows that the entire pick or series of knots is completed throughout the entire width of the fabric, irrespective of however wide it may be, by said six ratchet movements.

While the above pattern weaving is in progress (i. e. during the six ratchet movements mentioned), the controlling segment 192 is held upward by its spring 210 in position to permit the pawl 183 to move the ratchet 182 each time a distance of two teeth, but at the end of said six ratchet movements the controlling chain 203 brings two of its rolls (diagrammatically designated in Fig. 46 as 211 and 212) successively into controlling position, thereby lowering the controlling segment 192 so as to permit the pawl 183 to have its full 90-degree engaging swing with the ratchet 182, so that all the shuttle carriers are restored to their original or starting position by two ratchet movements, during which the shedding mechanism for the binder threads is operated and two picks of binder threads are shot across the loom. This is the operation when weaving according to the preferred arrangement, in which an entire row or pick of pattern weaving is succeeded by two picks of binder thread each time, in accordance with the manner of weaving oriental rugs, but it will be understood that the mechanism of my loom has a wide range of adaptability to various weaves, depending upon the arrangement of the controlling chain 203, the shedding mechanisms and pattern control.

In Figs. 48-61 I have illustrated the operation of my loom in weaving one form of oriental knot, viz. the Persian knot, and I will describe the same at this point in order that the loom itself may be more readily understood with reference to this illustration, although not limited to this or any other particular form of knot or weaving except as so limited in certain of the restricted claims. I have illustrated the weaving in connection with three sections, greatly enlarged, in order that that feature of my invention may be more clearly presented which includes dividing the widthwise weaving into very short or small sections, in which the weaving proceeds simultaneously throughout the width of the loom so that the entire width of the fabric is woven in the short time occupied by any individual shuttle in weaving its small section (i. e. three quarters of an inch as herein shown). Starting with the shuttle at the right hand side of its carrier, the second warp thread 213 of each section is raised by its lifting wire 126 so that said warp thread is pulled up into the top end of the slot 64 of the shuttle carrier, and thereupon the shuttle is shifted by the adjacent right hand shuttle shifter 47 from the position shown in Figs. 48, 58 to the position shown in Figs. 49, 59, the result being that the shuttle thread 103 is shot underneath the lifted warp thread 213. Thereupon the shuttle shifters move from their oblique position shown in Fig. 59 to their straight position shown in Fig. 60, and said lifted warp thread is lowered and the adjacent right hand warp thread 214 is raised, the parts being then in the position shown in Figs. 50 and 60 with the shuttle at the left hand side of the slot 64 of its shuttle carrier and the warp thread 214 raised above said shuttle to the upper end of said slot 64. Thereupon the left hand shuttle shifter 47 operates to shift the shuttle back to the right hand side of its carrier, thereby shooting the shuttle thread 103 underneath the raised warp thread 214 to the position shown in Figs. 51 and 61. The shuttle shifters are thereupon restored to their straight position as shown in Fig. 58 and the raised warp threads 214 are lowered, the parts then being in the position shown in Fig. 52, one knot having been completed in each section. The shuttle carriers and shifters are then raised to the position shown in Fig. 11 by their lever 92 while the lay beats up the knots thus far formed. Several important points may be mentioned here, which conspire to produce uniform and perfect weaving of the pattern weft threads. The dents or wires of the reed 7 occupy the position indicated by dotted lines in Figs. 54 and 57 with relation to the knot which is to be beaten up, so that the coils or turns composing said knot are beaten up accurately and fully to the fell at the same time that its pattern weft thread is being gradually pulled tighter and tighter by the hand rail of the lay and the yielding pull of the spring 108 of the shuttle. My object has been to provide mechanical means for pulling the stitch or knot tight in as nearly as possible the same manner that a seamstress uses in pulling the thread taut after each stitch in nice sewing. This prevents any possibility of the formation of kinks in the pattern weft threads.

I provide mechanism (and intend to claim the same broadly irrespective of the preferred details herein) whereby, as each knot is formed or woven, said knot is moved accurately from the point remote from the fell where begun into its final position at the fell, and its thread is at the same time pulled back tight and prevented from loosening again. This preferably takes place gradually, which still further tends to make it impossible for any kinks to form in the thread or yarn. The lifting of the shuttles also aids in producing the long easy or loose roll or twist of the pattern weft thread with relation to its two warp threads which coöperates with the dents or wires and hand rail of the lay in maintaining the pattern weft thread smooth and without kinks, said long bend or twist being somewhat indicated in Fig. 61, although in practice it is preferably several inches long.

Figures 53, 54, 55:
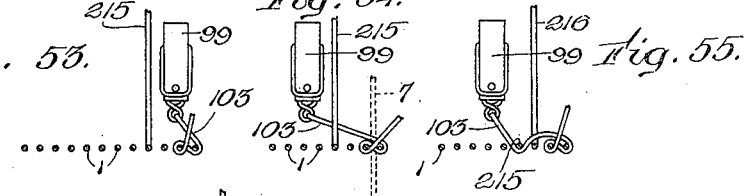

In connection with the foregoing, a further important feature in securing and maintaining a perfect weave of the pattern weft thread resides in hooking or otherwise holding each weft thread tight on a pile needle as shown in Figs. 23 and 43, as will presently be described. After this beating-up operation has been done, the pattern shedding mechanism lifts the warp threads 215 of each section into the slots 64 of the shuttle carriers to the position shown in Fig. 53, each shuttle is shifted from the right hand side of its carrier to the left hand side under the lifted warp thread 215 to the position shown in Fig. 54, said lifted warp threads are lowered, the third warp thread 216 of each section is raised into the slot 64 of the shuttle carrier of that section, as shown in Fig. 55, the shuttle is shifted back to the right as shown in Fig. 56, and the warp threads 216 are lowered, thereby completing the second knot of each section. Said knots are then beaten up as before. When this process has been repeated four times more so as to complete the number of knots required for a single section, the result is that all the sections have been woven and the entire pick of knots across the loom has been completed, the weaving being as shown in Fig. 57, and the binder threads are then woven in as before described. Besides the step by step movement, a further important feature which coöperates with the thin shuttles, narrow shuttle carriers, and their step by step or lateral-shifting movement, is the harness arrangement and its control, shown in detail in Figs. 44 and 45, the former showing the harness tie and the latter a portion of the controlling web 161 for the pattern shedding movement corresponding to a complete division of my present arrangement for a sixty four knot pattern weave. To each lifter wire are tied six heddles, one from each of six sections of the warp threads which go to constitute one division. In this manner only such a distance of warp threads is controlled by one lifting wire as to insure the even or level lifting of the warp threads, and the weaving of the pattern weft threads may be as fine or coarse as desired. The sections are preferably made quite narrow, and hence the divisions are narrow. Preferably also all the sections of a division are tied the same and all the divisions of the harness are tied the same, although my loom makes it feasible to vary from this arrangement, making the different divisions different. The main advantage of this arrangement is in connection with the color pattern which is yet to be described. In Fig. 44 I have indicated the successive lifting wires of a section by the numerals 1, 2, 3, etc., and have indicated in the lower portion of the figure the spaces occupied by the respective heddles. The heddles pass through a compart board 217 which comprises opposite bars 218, supporting transverse guide wires 219 and longitudinal guide wires 220, so as to keep the different heddles separated and in line with the reed in usual manner. In Fig. 45 the pattern web 161 is indicated perforated to correspond to the harness tie shown in Fig. 44, for tying the knots shown in Figs. 57, 26, 27. The first twelve rows from the top downward correspond to the first six ratchet movements or sidewise step by step movements of the shuttles and shuttle carriers, there being two shedding movements of the pattern weaving for each knot (when weaving the Persian knot), this varying of course according to the kind of knot being woven, and the last four rows at the bottom of the division shown in Fig. 45 providing for the two binding picks, the shredding movement for the latter being slow because of the longer distance of travel of the binder thread as compared with the very short travel of the shuttle thread or pattern weft thread and the heavy work of the binder shedding movement in lifting half of the lingoes as compared with the light work and rapid movement in connection with the shuttle thread. In Fig. 45 the "X" in each row indicates the solid or imperforate portion of the web which engages the corresponding indicating wire and thereby causes its lifting wire to be swung on the transverse rod 137 as a pivot into position to be lifted by the lifting knife 140, the adjacent perforations permitting the indicating wires 129 and hence the lifting wires to remain unmoved when the pattern cylinder and pattern web swing forward.

I now come to that portion of the mechanism of my preferred construction of loom herein being explained whereby one of the main features of my invention is carried out, viz. the selection of any shuttle in any group across the loom is made possible; so that a multi-color pattern may be woven having a portion of the pattern in one section and a different portion in another section. As already stated, the shuttle carriers are independently moved by the actuators or pushers 79, which serve to move said shuttle carriers downward against their springs 70. Each actuator 79 has at its rear lower edge a series of stepped notches 221, herein shown as three in number, corresponding to the number of shuttles carried by each shuttle carrier, so positioned that when the lower notch engages a shuttle carrier, said carrier will be moved relatively to the adjacent shuttle shifters 47 so that the top shuttle 38 is brought into position opposite the ends 48 of said shifters, and when the middle notch engages a shuttle carrier, the middle shuttle 39 is brought into position to be operated by the shuttle shifter, and when the top notch engages the shuttle carrier, the latter is caused to halt in its downward movement in position to have its bottom shuttle 40 operated by the shuttle shifter. These actuators 79 are loosely pivoted along the bar 91 so that a single actuator comes opposite each shuttle carrier, and they are raised and lowered by the levers 92 which swing the bar 91 up and down, said actuators being normally held outward against the adjusting stops 78 by individual springs 222 which bear against their upper ends, and said upper ends have rearward projections or lugs 223 to engage and be actuated by a pattern chain 224, Fig. 11, which may be of any usual or preferred kind, being herein shown as of the peg or pin variety, in which successive pins 225 project from cross bars 226, as clearly shown in Figs. 13 and 14, there being one pin or space on each bar for each successive step by step position of the shuttle carriers and their actuators as the knot-tying or weaving progresses across the loom. The pattern chain 224 is actuated by a usual chain shaft 227 pivotally mounted in the lower ends of rocker arms 228, Figs. 4, 6, and 9, fast on a rock shaft 229. A ratchet wheel 230 actuated by a pawl 231 carried by a bell crank 232, and a dwell wheel 233 coöperating with a dwell or locking lever 234 held thereagainst by a spring 235 control the rotation of the chain shaft 227 in usual manner. The bell crank 232 is actuated by a rod 236 which connects to a bell crank 237 on the main frame, to which is adjustably connected an eccentric lever 238 actuated for convenience by an eccentric 239 on a crank shaft 240. This crank shaft operates the lay 8 by means of connectors 241 pivoted to the rear side of the lay at one end and to cranks 242 at their other ends.

To prevent the actuation of the chain shaft and pattern chain at each beat of the lay (its pawl 231 being actuated for convenience from the lay crank shaft), I have provided the pawl 231 with a rear extension or tail piece 243 which projects rigidly from said pawl at 244, said tail piece extending rearwardly in position to be engaged by a finger or down-hold 245 pivoted to the head frame 143 and actuated by a rod 246, bell crank 247, rod 248, bell crank 249, link 250 and lever 251. The lever 251 is controlled by the controlling chain 203 whose rolls 252, Fig. 46, hold the pawl 231 out, in inoperative position during the six beating-up movements of the individual knot-tying and the one beating-up movement of the first pick of binder thread, said pawl being permitted by the vacant space 253 in the controlling chain, to operate the chain roll and pattern chain on the remaining beating-up movement of the second pick of binder thread. Thus, in the preferred construction of the present embodiment of my invention, the pattern chain is moved one bar after the completion of the weaving of one row of pattern weft thread or knots across the width of the fabric and before the beginning of the weaving of the next row of pattern weft thread across the width of the loom. The chain roll 227 and the bar of the pattern chain which has thus been brought into operative position, are swung forward (in this particular weave) when the shuttles are on the right sides of their shuttle carriers, i. e. before any weaving movement or throw of the shuttles takes place, and preferably while the shuttles and their shuttle carriers are in their most upward position as shown in Fig. 11, the result being that the pattern pins 225, see Fig. 13, in front of which are the selector ends 223, engage the latter and correspondingly swing said selectors into position in accordance with the lengths of the particular pins 225. Thereupon the selectors are moved downwardly and bring the particular shuttles and therefore colors selected into weaving position. For instance in Fig. 13 the lower selector is engaged by a medium length pin 225, which would bring the middle shuttle of that group of shuttles into weaving position, whereas the next selector is engaged by a short pin, which would bring the bottom shuttle of its group of shuttles into weaving position, and the remaining selector is engaged by a long pin, which would bring the top shuttle of that group of shuttles into weaving position. The weaving having then taken place in accordance with this selection of shuttles and colors, the step by step ratchet mechanism shifts all the shuttles, shuttle carriers and selectors one step, thereby bringing those pins 225 of the pattern chain bar 226 into engagement with said selectors which occupy the next space on said bar to those pins which were previously engaged, which, as shown in Fig. 13, results in bringing the top shuttle 38 of all three selectors into weaving position so that the same color weaves simultaneously in three successive sections.

The next step movement of the shuttles, shuttle carriers, etc., brings the third pin of each section of the pattern bar into engagement with the respective selectors 79, so that the middle shuttle and color of the first selector is moved to weaving position, the bottom shuttle and color of the second selector and the top shuttle of the third selector, thereby repeating exactly the same shuttles and colors in this knot that were used in making the first knot mentioned. Whenever it is desired to omit weaving a knot in accordance with a particular pattern, the pattern pin is simply omitted, as indicated at 254, Figs. 13 and 14, whereupon that particular shuttle carrier remains up, its selector 79 remaining in the position shown nearest the observer in Fig. 11 against the stop 78. As a convenient means of preventing the shuttle carriers and their shuttles from being moved down when the picks of binder thread are being woven, I arrange means for preventing the forward swinging of the chain roll and pattern chain during the weaving of said two picks of binder thread, the preferred mechanism for accomplishing this result being shown in detail in Fig. 7, where it will be seen that the shaft 229 is provided with a rocker arm 255 which is loose on said shaft and an arm 256 which is keyed on said shaft, a bolt 257 being provided for locking said two arms together when it is desired to rock the shaft 229 and hence swing the pattern chain, and to unlock said two arms when the pattern chain is to remain back. This bolt is carried in the free end of an arm 258 whose hub 259 slides on the keyed end of the shaft 229, being grooved at 260 to receive the yoke end 261, Fig. 6, of an arm 262 whose shaft 263 is rocked by an arm 264, Fig. 3, to which is adjustably secured a rod 265 actuated by a bell crank 266 on the main frame connected to an actuator 267 operated by a bell crank 268 mounted on a rear transverse girt 269 of the machine, see Fig. 8, connected by a link 270, see also Fig. 32, herein shown as operated by the picking lever 271. This lever is actuated at proper times by a cam 272 on the shaft 63 by a cam lever 273 with which it is automatically connected and disconnected by a bolt 274 moved by the cam edge 275 of a lever 276. This lever is actuated by a rod 277, bell crank 278, see also Fig. 1, vertical rod 279, and lever 280. When the rolls 281 of the controlling chain 203, Fig. 46, engage said lever 280 and thereby raise the same, they operate to move the locking pin 274 downward, Fig. 32, so that the cam 272 can thereby operate the train of mechanism to move the bolt 257, Fig. 7, outward so as to render the rocking lever 255 inoperative and thereby prevent the pattern chain from being swung forward. The rocking lever 255 is operated by a rod 282, Fig. 6, cam lever 283 and cam 284. To insure the proper positioning of the two levers 255, 256, so as to be locked and unlocked by the bolt 257 without friction, I provide in a stand 285 above said levers, see Figs. 3 and 6, two set screws 286 in position to engage respectively said levers and thereby position them with absolute accuracy at the end of their upward movement. The weight of the chain shaft and pattern chain maintains these levers under constant tendency to move against said set screws 286, but to make this movement still more certain I preferably interpose a spring 287. A giveaway construction 288 is provided between the lever 255 and the rod 282 to take up the extra throw of the cam 284, which I preferably provide so as to make sure that the lever 255 will always have sufficient movement to bring it hard against its set screw 286. This mechanism insures perfect accuracy and freedom of the swinging movement of the pattern chain. When the pattern chain is engaging the actuators, the parts are in the position shown in Fig. 11, but as soon as the actuators have been shifted by the pattern chain to the color positions required in accordance with the pattern being woven, the actuators 79 are automatically locked against improper movement.

The form of locking mechanism herein shown comprises a lock knife or detent bar 289 which extends across the machine and is pivoted at its opposite ends to the free ends of arms or links 290, 291, as best shown in Fig. 15, the former being pivoted at its opposite end to the shaft 91 which carries said actuators, and the latter at 292 to brackets 293 extending rigidly upward from the arm 94 of the main bracket 75. At one end the detent bar 289 extends beyond its pivot to form a releasing lever 294 in the path of a tripping lever 295 pivoted at 296 to the front arch 297 of the loom and actuated by a rod 298 and lever 299, see also Figs. 3 and 8, pivoted on the stud 60 and having its cam roll 300 moved by a cam 301 on the shaft 63. To coöperate with this knife detent 289, I provide each actuator 79 with a forwardly projecting arm or sector 302 having notches in its upper edge, as clearly shown in Figs. 10, 11 and 15, the outer notch coöperating with said detent to lock the actuators in inoperative position and the other notches in the three shuttle-selecting positions respectively. Thus when the selectors are raised to the position shown in Fig. 11, the detent bar 289 is automatically lifted out of locking engagement with said selectors, permitting the springs 222 to push all of the selectors back as far as the adjustable stops 78 will permit, ready to be engaged by the pins of the particular pattern bar 226 which is then operative, this disengagement of the detent bar 289 being effected by the striking of its arm 294 against the outer end of the tripping lever 295. As soon as the selecting pins 225 of the pattern chain have moved the various actuators 79 to proper shuttle-selecting positions, the cam 301 raises the tripping lever 295, thereby permitting the detent bar 289 to fall into locking engagement with the notches of all of said actuators while the pattern chain is still in its forward position, and said detent thereafter goes down with the actuators 79, maintaining them locked until again ready to be engaged by the pattern chain. Preferably also I provide means to protect the pattern shuttles and shuttle carriers from damage by the fly shuttle when the binder thread is being shot through the loom, said means being shown for convenience as rearwardly projecting fingers 303, 304 adjustably secured on the rod 298 in position to be engaged by a moving portion of the binder shedding mechanism when said shed is made, so that thereby the rod 298 is lifted and hence the detent 289 is tripped or raised whenever the shed for the binder weft thread is made. This shedding mechanism is best shown in Figs. 4, 9, 15-17.

The lifting wires 125, 126 are provided respectively with crimps or lifting projections 305, 306 respectively, and coöperating therewith are lifting plates or shedding knives 307, 308 pivoted at 309, 310 respectively on sliding brackets 311 mounted to slide on fixed guide rods 312 and lifted and lowered by rods 313 actuated by eccentrics 314 on the picking shaft 15. The pivot 309 of the upper lifting plate or shedding knife 307 is provided at the right hand end, see Figs. 16 and 17, with an arm 316 provided with a roll 317 to coöperate with a cam 318, and the pivot 310 of the other lifting plate or shedding knife 308 is provided with a similar arm 319 whose roll 320 coöperates with a similar cam 321, said two cams being fast on a shaft 322 on whose outer end is a ratchet 323 in position to engage a pawl 324, see also Fig. 15, mounted on a fixed part of the machine and normally held forward by a spring 325, a dwell wheel 326 and locking lever 327 and its spring 328 serving to hold the cams and connected parts against accidental movement. Thus each time the main shedding movement is required, the pawl 324 operates to turn outwardly one of the shedding knives or plates 307 or 308 as the case may be, the knife 308 being shown as turned outwardly and in lifting engagement with the projections 306 of the lifting wires 126, thereby operating all of said lifting wires 126 to lift half of the warp threads, and form the shed as shown in Fig. 4. On the next descent of the shedding plates the pawl 324 turns the cams so as to reverse the position of the shedding plates, turning the plate 308 into vertical position and thereby leaving the wires 126 down, and turning the plate 307 into outward position, so that upon its upward movement it engages the projections 305 of the lifting wires 125, which lifts the other half of the warp threads and completes the other half of the warp threads as required for the shedding movement.

As I have shown, in this particular embodiment of my invention, the raising means for raising these shedding knives or plates, as being operated in unison with the weaving movements, I have constructed the cams 318, 321 and the ratchet 323 so as to maintain both shedding plates in a vertical position during six reciprocations of the rod 313 and then turn outwardly one of said shedding plates on the next reciprocation, and the other of said shedding plates on the next reciprocation after that one. This arrangement is required when it is desired to use two binding picks after the formation of a complete row of knots in accordance with the kind of weaving being herein described for purposes of illustration. Of course, if only one binder pick were used, only one plate would be moved outwardly, followed by the weaving of another row of knots, and then the other shedding plate would be moved outwardly to reverse the shed for another single binder pick, all as will be readily understood by the skilled weaver. The binder shed having been formed, the fly shuttle 329 is driven by any suitable mechanism, being herein shown as driven by picking sticks 330 pivoted at 331 on stands on the rocker shaft 332 of the lay 8. Each picking stick is provided on its inner side with a curved shoe 333 by which it is pressed downward against the tension of a spring 334, said shoe being engaged at its upper side by the free end of a picking lever 335 pivoted at 336 to a swiveled support 337 pivoted at 338 to the frame of the machine, said picking lever being depressed by an adjustably mounted picking shoe 339 adjacent its free end engaged by an adjustable cam 340 and raised by a spring 341 secured to a strap 342 around said lever. The cam 272, see Figs. 8 and 32, levers 273, 271 and connectors 343 rock the lever 335 on its pivot 336 under the control of the rolls 281 of the controlling chain 203 so as to swing the picking shoe 339 into engagement with the cam 340 when the binder threads are to be shot across, said shoe remaining in inoperative position at all other times. After each pick (as well as after the weaving of each knot) the lay 8 is beaten up by the crank shaft 240 and connectors 241, said crank shaft being actuated by the mutilated gears 344, 345, the latter being fast on the main drive shaft 346 whose gear 347 is driven by a pinion 348 and pulley 349 on a pulley shaft 350. After each binder pick and the completion of each row of pattern weaving, rolls 351 of the controller chain 203 actuate the take-up, engaging a lever 352, Fig. 28, which operates through a connector 353, bell crank 354 and rod 355 to swing a lever 356 whose shaft 357 swings an arm 358 out of engagement with the tail end 359 of the pawl 18 of the take-up ratchet, so that as said pawl reciprocates it actuates the take-up.

As already stated, after the tying of each knot or individual shuttle weave of the pattern shuttles, the reed beats up the pattern yarn 103 to the position shown in full lines in Fig. 43, at the point where the hooked ends 360 of pile wires 361 become operative, the take-up and other coöperating mechanism maintaining the fell at this point. These pile wires and the cutting mechanism are best shown in Figs. 22–25, where it will be seen that the pile wires 361 are in the form of relatively short, strong blades having enlarged butt ends 362 clamped in a pile-wire bar 363 by a clamping plate 364, said wires being spaced apart by shims 365 and clamped endwise by clamping bolts 366. The bar 363 forms the rear part of a frame 367 pivoted at 368 in end slides 369 mounted to move in slightly inclined ways 370 of a block 371 which is bolted to the breast beam 9. The slides 369 are actuated by links 372, bell cranks 373, and rods 374. The latter are adjustably secured to levers 375, see Fig. 28, fast on a shaft 376 rocked by the lay 8 to which it is connected by a link 377 and lever 378.

Adjacent the front of the frame 367 is pivoted a shaft 379 on which are immovably clamped a series of cutting knives 380, best shown in Fig. 22. These knives have a circular or arc-shaped cutting edge 381, and are preferably given a rotary or rocking movement, the edge of each knife fitting preferably into a groove 382 provided therefor in the top edge of the coöperating pile wire 361 which is just below said knife. The preferred rocking movement of the knives is herein shown as provided by means of cranks or levers 383 fast on the knife shaft 379 and slotted at their lower ends to straddle pins 384 which project from brackets 385 carried by the breast beam. Thus each time that the lay beats forward, the pile-wire frame and its pile wires move downward with a dipping action toward the pile threads or upper part of the pattern shed close to or, if desired, slightly entering the reed, and at the same time those pile loops which are already on the wires are being sheared through evenly by the cutters 380. The upper end of each hook is offset a little, as plainly shown in the plan view, Fig. 25, and this, taken in connection with the taut position of the pattern thread as shown in Fig. 43, insures the catching of each thread by its pile wire, as clearly shown in Fig. 22. As the lay moves back, the pile wires move away from the fell toward the front.

In order better to provide for the two sheds, i. e. the pattern shed and the binder shed, I have constructed my loom to make the latter shed in a relatively low plane below the level of the breast beam, and accordingly to hold the warp threads up properly level at the moment of the beating-up operation and also to reduce or render as small as possible the amount of slack from the pattern shuttles at the moment of beating up, and to coöperate to the best advantage with the various other operations taking place at the fell, I provide immediately below the same, and preferably operating in front of the lay, a warp lifting bar 386 which, when so located, is supported at its ends by levers 387 pivoted to the back of the breast beam and raised by rods 388, see Figs. 23 and 28, and levers 389 fast on the rock shaft 376. This mechanism raises the warp lifter or bar 386 against the under side of the warp threads practically simultaneously with the beating-up pressure of the reed, so that thereby the warps are raised to the desired level adjacent the top of the reed, the slack of the pattern threads 103 produced by the hand rail of the reed is as little as possible, and the distance between the bottom of the hand rail and the fell is only just sufficient to give free entrance to the hooked ends of the pile needles, thereby increasing the angle of the pattern thread as much as possible toward the fabric, which facilitates the engagement of said thread by the hook. The lay preferably carries a protection dagger 390 to strike against a bunter 391 on the frame under the breast beam lying against a rubber cushion 392, the shaft of said bunter carrying a lever 393 at its outer end, see Figs. 29 and 33, in position to trip the lever 35, thereby putting on the brake and knocking off the shipper handle in well known manner. The protection daggers 390 are fast on a protector rod 394 to which are pinned or otherwise rigidly fastened fingers 395 provided at their upper ends with adjustable screws 396 whereby all the adjustment is brought to the outer end of the fingers. On the driving shaft 350 is a pinion 397 which meshes with a gear 398 on the shaft 63, said gear 398 in turn driving an idler 399 meshing with a gear 400 on the shaft 15.

The use and operation of my loom is as follows: The warp threads 1 are drawn in through the heddles 6 and reed 7 and over the breast beam 9 the same as usual in ordinary looms. The multitude of small shuttles 38, 39, 40 (whatever the number in each group may be) are filled with cops or bobbins of such yarns and colors as may be called for by the particular kind of fabric and pattern to be woven, and each shuttle carrier 41 is provided with its complement or group of said shuttles. A few picks of binder thread from the binder shuttle 329 are first shot back and forth at the beginning of the fabric (either by hand or by power according to the usual custom of the weaver) and then the thread end from each shuttle is drawn through the shuttle-eye 102 and under the spring tension, through the glass take-up eye 107 or 121 as the case may be, and out through the guiding means of the shuttle to the warp threads, where all of the pattern shuttle thread ends are secured in the well known manner common in pattern shuttle looms. Usually a few more picks of binder weft are now shot through. Thereupon the regular pattern weaving begins, the lay being on its return from having beaten up the last binder pick and the parts having been left in the position shown in Fig. 11, with the lock knife or detent bar 289 raised from engagement with the actuators 79 which permitted the upper ends of the latter to be all moved backwardly by their springs 222 in even alinement and then moved forward to different degrees by the pins 225 of the controlling bar 226 of the pattern chain which is then at the front of the chain shaft 227. Said pattern chain has been swung forward by its shaft 227 actuated by the arms 255 and 256, locked by the bolt 257, and moved by the parts 282—284, with the result that the various actuators are swung to positions corresponding to the lengths of the pattern pins 225 or such other controlling mechanism as may be employed. As soon as this takes place the tripping lever 295 is raised by its cam 301 so as to permit the locking detent 289 to lock all of said actuators 79 in their new positions while still so held by the pattern chain, this taking place on the last of the backward movement of the lay. The pattern chain then swings back away from said actuators and the actuators are all moved downward by the arms 92 and their cams 95. As the actuators or pushers 79 move downward, their notches 221 engage the respective shuttle carriers 41, thereby moving said shuttle carriers downward to the varying distances called for by said notches as determined by the pattern, and at the same time the links 90 and levers 88 move the shuttle shifters 47 downward to their uniform position as shown in Figs. 1, 3, 4, 6, 9 and 15, these figures, however, showing the carriers raised (during the binder weaving).

Figure 48:
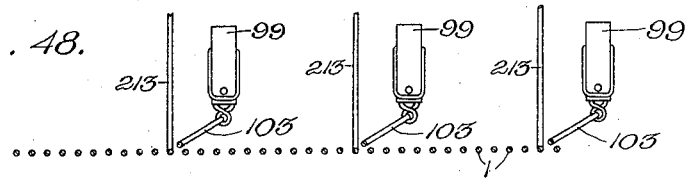
Figure 49:
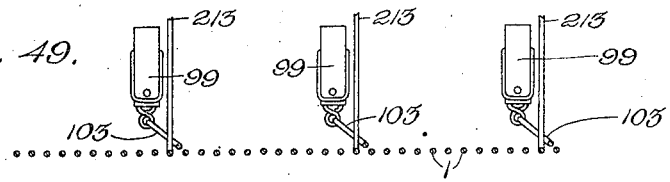
Figure 50:
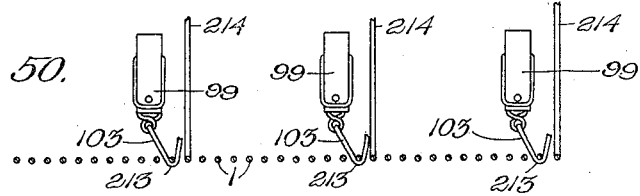
Figure 51:
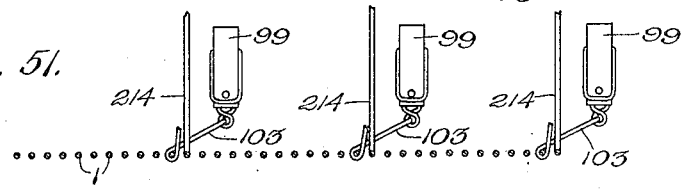
Figure 52:
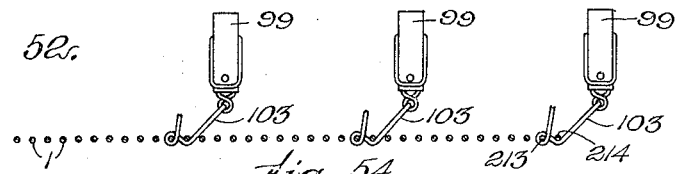

While the shuttle carriers and other parts mentioned are moving downward, the pattern shed is being formed. This is accomplished by the forward swinging of the pattern shedding cylinder 159 and its pattern chain or web 161 by the cam 173, against the indicator wires 129, which operates to push the selected lifting wires 125, 126 forward where their hooks are caught and lifted by the upwardly moving lifting knife 140 actuated by the cam 154. This movement of the lifting wires raises all those warp threads called for by the shedding pattern 161, said warp threads being raised in gangs or sets as illustrated in Fig. 44 and each occupying the upper end of the slot 64 of the adjacent shuttle carrier 41. The result is that by the time the shuttles have been lowered to their varying selected positions the selected pattern shed is ready for them, each of the shuttles (in the particular embodiment and arrangement of working the shuttles herein shown and previously explained) being at the right hand side of its thread, looking from the front of the machine, as shown in Fig. 48. Thereupon all the shuttles are shifted by the shifters 47 by the engagement of the rack bar 50 with their pinions 49 held in the beam 46 and actuated by the cam 62. As herein shown, the shuttle shifters 47 are always lowered to the same point, as I prefer to vary the positions of the shuttles rather than the shuttle shifters, but it will be understood that in this, as in fact in all the details of my machine, I am not limited to the preferred embodiment herein shown. The successive positions of the shuttle shifters and hence of the shuttles are indicated in Figs. 58–61. The shed is changed, i. e. the lifted warp threads 213, Fig. 48, are lowered, as shown in Fig. 50, and the adjacent warp threads 214 are raised by the pattern shedding mechanism 125, 126, 159, 161, etc., before the shuttle shifters move the shuttles to the position shown in Figs. 51 and 61, and then while the warp threads 214 are being lowered from their position in Fig. 51 to their position Fig. 52, the shuttle carriers and their shuttles are being raised to the position shown in Fig. 11 to permit the separated knots which have thus been woven to be beaten up by the forward movement of the lay 8 actuated by the crank shaft 240. Just before and as the lay is going forward, all the shuttle carriers 41 with their groups of shuttles 38, 39, 40 and the shuttle shifters 47 and actuators 79 and connected parts are being moved one step to the left by the step-by-step mechanism shown in Fig. 1, the heart cam 179 being turned by the ratchet wheel 182 one step by its pawl 183 under the control of the controlling segment 192, the pawl being actuated by the cam 189 and the controlling segment being controlled by the controller chain 203. Also as the lay is moving forward the warp lifter 386 is being moved upward thereby, the pile wires 361 are being dipped downward and moved toward the reed to the position shown in Fig. 43, and the pile-loop cutter knives 381 are being rocked in cutting relation with said pile wires. When the lay reaches its forward position, as shown in Fig. 43, its hand rail coöperates with the take-up spring 108 of each shuttle to pull each knot tight as a seamstress pulls her stitches tight, said spring 108 serving to maintain the taut condition of the pattern thread as the lay moves back, thereby further aiding in maintaining a good weave and engaging the pile loops over the hooked ends of the pile wires. Also while the lay is going forward the controller chain 203 is being turned over one bar by its cam 209. Meanwhile, and also during the formation of the succeeding five knots and the first binder pick following thereafter, the feeding mechanism of the pattern chain 224 is being held in inoperative position by the rolls 252, Fig. 46, of the controller chain 203. While the lateral shifting of the shuttle carriers, etc. is taking place, the lock knife or detent 289 is being raised from the actuators or pushers 79, and, just as this lateral movement or step is finished, the pattern chain is again swung forward, thereby bringing into engagement with the various actuator ears 223 the next pattern pins 225 to those which previously engaged said actuators and controlled the selection of the shuttles, so that this time, although the pattern chain has not been moved, another set of pins of the bar 226 determines the particular shuttles which shall weave. The same cycle of weaving movements now takes place as before, and when each shuttle has woven its knot, the same beating-up movement and other attendant movements take place as already described. Thereupon all the shuttle carriers and their shuttles are again raised and shifted one step to the left, and the pattern chain engages the third pattern pin 225 of each section. After the weaving of a knot by each selected shuttle in accordance with this pattern selection and the beating-up of said knot, etc., the shuttle-carrying and selecting mechanism is shifted again one step to the left and the pattern chain is then brought forward to move the actuators or pushers 79 in accordance with the fourth pin of each section of the pattern chain bar 226. Each shuttle thus selected then weaves a fourth knot in its section, and said knots having been beaten up, pulled tight, the pile loops formed, etc., all as before, the shuttle carriers etc. are shifted to the left one step again, thereby bringing their actuators into position in front of the fifth pin of each section of the pattern chain bar 226, the cycle of weaving operations and beating up, etc. again takes place, and the shuttle carriers and connected parts are again shifted one step to the left, thereby bringing their actuators into position in front of the sixth pattern pin of each section of the pattern chain bar 226. Each selected shuttle now weaves a sixth knot in its section of the weaving, which is then beaten up, etc., as before, and as the loom of the drawings is shown and has been described for weaving in sections of six knots each, the result is that now the entire pick or row of knots has been woven straight across the loom as a continuous row of oriental knots and pile loops.

The pattern chain or web 161, having been ratcheted around one step at each pattern warp shedding movement, i. e. twice for each knot, for the raising of the threads 213, 214, Figs. 48–51, now reaches the pattern row 401, which, being all holes, leaves the lifting wires 125, 126 undisturbed in their inoperative position, so that no pattern shedding takes place, and at the same time the color pattern chain 224 and its swinging mechanism are rendered inoperative by the withdrawal of the bolt 257 from the arm 255 of the pattern chain roll shaft, under the influence of the cam 275, Fig. 32, under the control of rolls 281 of the controlling chain 130

203, this movement taking place during the backward movement of the lay after beating up the sixth knot, and the shuttle carriers are consequently left in their raised position so that no pattern shuttle weaving can take place. Meanwhile, during the last forward and return swing of the lay, the binder shedding movement is taking place by the outward swinging of one of the shedding knives 307 or 308 and its upward lifting movement caused by the eccentrics 314. This same movement also operates the tripping lever 295 positively to trip the locking knife 289 so as to insure that no shuttle-carrier actuator or pusher 79 shall accidentally be left in operative position, irrespective of whether the mechanism shown in Fig. 7 has rendered the color pattern chain inoperative or not. As soon as this binder shed is formed, the binder shuttle 329 is shot through the loom by the adjacent picking stick actuated by the picking lever 335, cam 340 and shoe 339 turned into engagement therewith by the cam 272 connected therewith by the cam plate 275 actuated by the rolls 281 of the controller chain 203, said rolls being preferably depended upon both for rendering inoperative the color pattern chain and also for rendering operative the picking mechanism for the binder shuttle. The shedding knives 307, 308 move down and their relative positions are reversed so that the next upward movement thereof reverses the binder shed, and meanwhile the take-up roll 11 is operated by the picking shaft 15 under the control of a roll 351 of the controlling chain, and then the return pick of the binder thread is shot through the loom, and the take-up roll is again operated.

I have shown the controlling chain 203 as provided with three rolls 351 for three take-up movements, as it may be desired to operate the take-up for each transverse row or pick of weaving, although it is not necessary to operate the take-up for the pattern weaving unless the yarn or knots are large. While the two binder picks are being put in, the step-by-step pawl 183 is permitted by the controller segment 192 (actuated by the next two rolls of the controlling chain 203, Figs. 4 and 6, as diagrammatically indicated at 211, 212 in Fig. 46) to give the heart cam 179 a half turn, a quarter turn on each binder pick, and thereby shift back again all of the pattern weaving mechanism to its right hand position so that it is ready to start another series of pattern sections when the second binder pick has been beaten up. Also during the last binder pick, the color pattern chain 224 is moved forward one bar by the release of lever 245 from the tail piece 243 of its actuating pawl 231, said release being permitted by the blank space 253 of the controlling chain 203, and it being remembered that said pawl 231 is actuated by the eccentric 239 at each turn of the crank shaft 240. The controller chain 203 is advanced one position on each movement of the lay, and accordingly, looking at the division of the chain shown in Fig. 46 (corresponding to the weaving of one entire row of pattern weaving and two binder picks), in which the first vertical column is the control for the picking and the swing of the color pattern chain, the second column is the control for the take-up, the third for the feed of the pattern chain, and the fourth for the step-by-step movement, it will be understood that the first or top horizontal row of said controlling chain, which shows a blank in the picking column, a roll in the take-up column, a roll in the pattern chain column, and a blank in the step-by-step column, will result in rendering operative the pattern swinging mechanism, Fig. 7, and rendering inoperative the binder picking mechanism by turning the picking shoes 339 outward (these two operations being due to the blank in the picking column), will operate the take-up (due to the roll in the second vertical column) will raise the pattern actuating pawl to inoperative position (due to the roll in the third vertical column), and will raise the controlling segment 192 of the step-by-step mechanism so as to permit only a short-step movement for the knot-tying.

The second horizontal row of the controlling chain maintains the same condition of the binder picking mechanism and the swinging of the color pattern chain as before because of the space in the first column, and changes the take-up from operative to inoperative position because of the change from a roll to a space, maintains the same condition as before as to non-feeding of the color pattern chain because of the presence of another roll in that column, and maintains the same short-step condition of the step-by-step mechanism because of a space in the last or fourth column. Exactly the same condition is maintained by the third horizontal row of said controlling chain and also by the fourth, fifth, and sixth horizontal rows, as the knot-tying is in progress during the first six horizontal rows as shown in Fig. 46, but when the seventh row is reached, all the knots or transverse weavings of pattern yarns have taken place, so that an entire row of the pattern weaving has been completed and hence the condition in the first column is reversed, the roll 281 operating to render the binder picking operative and to stop the color pattern chain from swinging, and the roll 351 in the second column operating the take-up, but the roll in the next column still maintains inoperative the advancing of the color pattern chain because it is not desired to advance said pattern chain until the second row of binder thread is being put in, and the roll 211 operates to discontinue the short-step movement of the step-by-step mechanism and to give said mechanism a full-length movement or quarter turn of the heart cam. When the controller chain 203 is advanced to the last horizontal row, Fig. 46, another roll 281 maintains the forward swinging of the color pattern chain still inoperative and permits the second row of binder thread to be put in while the roll 351 causes the take-up to be operated once more, but in the third column a space now appears which results in the forward feeding of the pattern chain so as to bring a new pattern bar with its pattern pins into operative position for controlling the pattern of the next row of color weaving, and the roll 212 in the last column again causes a long-stop or quarter-turn movement of the step-by-step mechanism, which results in restoring the color pattern weaving mechanism to proper position for beginning a new row of knot-tying or pattern weaving. The binder weaving having been completed, and therefore the warp selector chain 161 having brought its four pattern rows of holes into operative position as shown at the bottom of Fig. 45, the next movement thereof brings into operative position a new section exactly the same as the section shown in Fig. 45, in which the first pattern row operates to raise the second warp thread of the section as indicated by the "X", the second pattern row operates to raise the first warp thread as indicated by the "X" in said row, the third operates to raise the fourth warp thread, the fourth to raise the third warp thread, the fifth to raise the sixth thread, the sixth to raise the fifth thread, and so on, as clearly indicated in Fig. 45. This lay-out is for weaving the Persian knot, which it has already been explained is being herein used as the most convenient means of explaining the construction and advantages of my invention. It will be understood that Fig. 45 is one section in length and one division in width, but not the full width of the chain, whose width corresponds to the width of the loom and may be many divisions in width, containing for instance in this forty-eight inch loom eleven divisions (provided the twelve-wire division is used as before referred to). In this case, see Fig. 44, each lifter wire lifts, of course, one heddle, and hence pattern warp thread, in each section of the six sections, and as two pattern warp threads are required for one knot, in the lay-out of the present machine, it follows that the twelve heddle wires control all the pattern warp threads of the six sections, twice as many lifting wires being necessary as there are knots to be tied (for a Persian knot).

It will be understood that the dividing of the weaving into divisions, and the divisions into sections is rendered desirable in order to facilitate the speed of weaving, so as to make the step-by-step progress short, but no demarcation appears or exists in the weaving itself, the fabric being continuous and homogeneous from one selvage to the other. In Fig. 47 I have shown a plan of the fabric three sections wide, as indicated by the imaginary section boundaries 402—405. All that is necessary, as to the width of a section, is that it shall be sufficiently wide to accommodate one shuttle carrier, the step-by-step movement of all the shuttle carriers preventing any shuttle carrier of one section remaining in the way of the shuttle carrier of another section, so that each vertical slot 64 is enabled to occupy operative positions in succession with relation to each of the warp threads in its section. By my construction of shuttle, shuttle carrier, shuttle shifter and in fact all the coöperating mechanisms, a high-speed loom of this character is practical having a section of only three quarters of an inch in width. As the side stepping movement of all the shuttle carriers takes places simultaneously throughout the width of the loom, a complete row of pattern weaves is accomplished in the short time required for one shuttle carrier to move three quarters of an inch. The same movement (or relative movement between the warp threads and the shuttle carrier, irrespective of which may move), taken in connection with the vertical movement of the group of shuttles of any one shuttle carrier with relation to its shifter (or the relative movement of said two parts irrespective of which may move) also makes possible a practically endless variety of pattern weaving, so that as many colors and varieties of arrangement thereof as may be desired may take place straight across the loom in a single continuous line. If a blank space or area is called for by the pattern, it is provided simply by omitting a pin or pins in the color-pattern chain 224 as indicated at 254, Figs. 13 and 14, which thereby causes all the group of shuttles of that shuttle carrier to be left up out of weaving relation to their shuttle shifter so that no color yarn is inserted at that point in that section of the weaving. One of the advantages of my invention is, however, that thereby it is made possible to do the pattern weaving in the form of transverse or weft thread Persian knots or such other varieties as shown in Figs. 26, 27, 57, 62–66, in such a manner as to cover with the pile yarn all the face of the web and showing the pattern on the back of the web, the same as in true oriental rugs. The piles are not cut until long after the beating-up operation, so that there is no possibility of losing the weft character of the knots. One advantage of having sections as well as divisions is that a separate pattern or order of colors may be weaving not only in different divisions but in all the different sections of any division or divisions. Each section can be made to weave a different pattern from the other sections, or each section can be made to weave a part of a pattern which requires the entire six sections of the division to make as a whole pattern, and so likewise the separate parts of a pattern can be woven by an entire division, all the sections of all the divisions being required to weave the entire pattern as for instance a very large pattern, reaching all the way across the fabric, and all this can be woven without making a single repeat. In doing this, every thread of the entire warp is covered or has a pile yarn looped around it throughout the width of the fabric. As there are not repeats across the fabric, it follows that my invention makes possible spot weaving with the same simultaneous heddle movement across the loom, weaving a series of spots all differing from each other in shape or color or both. All the color effect is produced by the pattern shuttle yarn or weft yarn, and as the warp threads are not depended upon for any of the pattern effect, the warp-lifting pattern chain is exceedingly simple and short, only requiring as much length as twice the number of steps or lateral shifting movements of the shuttle carriers. Notwithstanding the endless variety of pattern effect, only a repetition of the same two movements for the pattern shed are necessary. For instance in tying the Persian knot, six to the section, as herein, the pattern chain 161 need have only twelve rows of lifting or indicating holes, one for each warp thread, and four rows for the two binder picks (it being preferred to punch in these four rows of holes rather than to provide mechanism to stop the pattern chain during the binder shedding operation). Of course, it will be understood that in this loom, the same as is customary in all commercial looms, the usual parts to be changed for different weaves or number of picks per inch will be changed, as well understood by weavers. For instance, if the number of knots per inch is increased, the ratchet teeth of the step-by-step movement will be correspondingly increased and also the take-up ratchet, more bars will be inserted in the controller chain, and in the pattern shedding chain, the binder shedding will be given a correspondingly increased movement, the pins 225 in the color pattern chain will be spaced to correspond to the new step-by-step movement, and the heddles, reed, pile wires, and cutters will be correspondingly increased in number, etc.

While the step-by-step movement may be in either direction or both directions, the pattern shedding corresponding, I prefer the mechanism and operation herein shown, and likewise prefer to move the pattern shuttle carrying mechanism with relation to the warp threads rather than vice versa.

One advantage of my pile wire arrangement is that it not only makes certain the proper formation of the pile loops, but it facilitates the rapid weaving of knotted pile fabric regardless of width. Also, having formed the pile loops directly on these wires, they are held thereby continuously and without possibility of deformation until they are cut.

I have already made it clear that my invention is broadly new in its main features, as more explicitly pointed out in the following claims, and I wish also to make it clear that many of the features herein contained have a wide range of usefulness aside from the style or kind of weaving herein mainly contemplated. For instance, the pile-loop forming hooks and pile wires and their general operation are capable of use in Wilton carpet looms with the advantage of facilitating the convenient increase in width of such looms beyond their present range; the shedding mechanisms may be advantageously used with large varieties of looms, particularly with embroidery looms; and while many of my claims are restricted to transverse weaving with weft threads across the loom, various others of the claims are not so restricted, and it will be observed that various features of the mechanism are well adapted to a different weaving movement, as for instance by omitting the step-by-step motion, each group of shuttles would cooperate continuously with the same pair of warp threads or their equivalent, and the general direction of the pattern thread would then be lengthwise of the fabric.

Having described my invention, what I claim as new and desire to secure by Letters Patent is, 1. In a loom, means for holding the warp threads, and weaving mechanism, including a plurality of shuttles arranged in a plurality of groups spaced at intervals across the loom for weaving transversely of said warp threads, means for completing said transverse weaving progressively step by step, and means for operating the shuttles of the different groups in different orders.

2. In a loom, means for holding the warp threads, and weaving mechanism, including a plurality of shuttles arranged in a plurality of groups, said groups being spaced at intervals side by side across the loom for weaving transversely of said warp threads, and operating means for completing said transverse weaving progressively step by step in separate sections across the loom, said operating means including a common positive mover for all of the shuttles for reciprocating whichever shuttles are called upon to weave, and means for independently controlling the different groups, including means for maintaining any or all of the shuttles in any given group idle while the weaving progresses in the spaces occupied by the other groups.

3. In a loom, means for holding the warp threads, a plurality of groups of shuttles spaced at intervals across the loom, pattern mechanism for varying the relative weaving position of the shuttles of one group with relation to another group, shuttle actuating means independent of pattern control, and coöperating means for completing the weaving progressively step by step across the loom.

4. In a loom, means for holding the warp threads, a plurality of groups of shuttles spaced at intervals across the loom, a carrier for each group, pattern controlled means for moving said carriers to different positions with relation to each other for bringing any desired shuttle of any group into weaving position, and mechanism for actuating the shuttles thus brought into weaving position.

5. In a loom, means for holding the warp threads, a plurality of groups of shuttles spaced at intervals across the loom, a carrier for each group, pattern controlled means for moving said carriers to different positions with relation to each other for bringing any desired shuttle of any group into weaving position, and a common actuator for all of the shuttles to reciprocate whichever shuttles of the different groups are brought into weaving position on any given weaving movement.

6. In a loom, means for holding the warp threads, and weaving mechanism for weaving transversely of said warp threads, including a plurality of shuttles at intervals across the loom, means to reciprocate said shuttles to make only one complete line of weaving with a plurality of back-and-forth weaving movements of all of said shuttles, beating-up mechanism, and shedding mechanism, the aforesaid mechanisms being timed and arranged to give each weaving shuttle at least one complete back and forth weaving movement between consecutive beating-up movements.

7. In a loom, means for holding the warp threads, and weaving mechanism for weaving transversely of said warp threads, including a plurality of shuttles arranged in groups at intervals across the loom, selective means to bring the shuttles of different groups into different orders of operation, means to reciprocate the selected shuttles, beating-up mechanism, and shedding mechanism, the aforesaid mechanisms being timed and arranged to give each weaving shuttle a plurality of weaving movements between consecutive beating-up movements, and to repeat said movements progressively for forming a series of transverse coils around the warp threads across the loom, and means for laying binder thread when the series of said weaving movements has been completed across the loom.

8. In a loom, means for holding the warp threads, and weaving mechanism for weaving transversely of said warp threads, including a plurality of shuttles spaced apart across the loom, means to reciprocate said shuttles in weaving relation to the warp threads, and means to vary the relative positions in a transverse direction on a succeeding weaving movement of the shuttles operated on a preceding weaving movement.

9. In a loom, means for holding the warp threads, and weaving mechanism for weaving transversely of said warp threads, including a plurality of separate groups of shuttles for weaving sections of the fabric across the loom, selective mechanism for selecting any one of the shuttles of the respective groups, and shuttle-operating mechanism for weaving transversely across the fabric in each of the sections with any of the shuttles selected from the group of the given section as desired.

10. In a loom, means for holding the warp threads, and weaving mechanism, including pattern mechanism, shedding mechanism having an unvarying order of warp-thread lifting for a given number of warp threads in a section irrespective of variations of pattern, a plurality of shuttles spaced apart across the loom, and each having separate selective movement independent of all the other of said shuttles, means to reciprocate said shuttles in weaving relation to the warp threads, and means responsive to said pattern mechanism to give said shuttles their said separate, independent selective movement, for varying the relative positions of said shuttles on successive weaving movements.

11. In a loom, means for holding the warp threads, and weaving mechanism, including pattern mechanism, shedding mechanism having an unvarying order of warp-thread lifting for a given number of warp threads in a section irrespective of variations of pattern, a plurality of shuttles spaced apart across the loom, and each having separate selective movement independent of all the other of said shuttles, means to reciprocate said shuttles in weaving relation to the warp threads, means for advancing the weaving movement of the shuttles step-by-step across the loom for one complete transverse row of shuttle weaving, means responsive to said pattern mechanism to give said shuttles their separate, independent selective movement, for varying the relative positions of said shuttles on successive steps of said step by step weaving movements, and means for laying binder thread, operative only after a complete transverse row of said shuttle weaving has taken place.

12. In a loom, means for holding the warp threads, and weaving mechanism, including a plurality of multi-color shuttle weaving mechanisms for simultaneously weaving a corresponding plurality of sections transversely across the loom, and means for independently varying and selecting each color independently of all the other colors in said different sections for any one of said transverse weaving movements the colors woven therein.

13. In a loom, means for holding the warp threads, and weaving mechanism, including multi-color shuttle weaving mechanism, and mechanism coöperating therewith to weave a continuous line of multi-color weaving across the loom, said multi-color shuttle mechanism containing selective means to vary and select each color independently of all the other colors of said line.

14. In a loom, means for holding the warp threads, and weaving mechanism, including multi-color shuttle weaving mechanism, and mechanism coöperating therewith to weave step-by-step simultaneously at intervals a continuous line of multi-color weaving across the loom, said multi-color shuttle mechanism containing selective means to select each color in said line of weaving independently of the other colors of said line.

15. In a loom, means for holding the warp threads, and weaving mechanism, including a lay, pattern shedding mechanism and binder shedding mechanism, said two mechanisms comprising the same heddles and lifter wires, and actuating means to actuate the pattern shedding mechanism to lift the selected heddles and lifter wires with a plurality of quick high lifts relative to the binder shedding movement to one beat of the lay and to one actuation of the binder shedding mechanism.

16. In a loom, means for holding the warp threads, and weaving mechanism, including a lay having a substantially uniformly timed beating movement, pattern shedding mechanism and binder shedding mechanism, said two shedding mechanisms comprising the same heddles and lifter wires, and actuating means to actuate the pattern shedding mechanism a plurality of times in the interval between two beats of the lay and to actuate the binder shedding mechanism once in the interval between two beats of the lay.

17. In a loom, means for holding the warp threads, and pile-loop forming mechanism, including weaving means to coil weft threads in oriental knots about the warp threads and form the pile loops dissimultaneously across the fabric.

18. In a loom, means for holding the warp threads, and pile-loop forming mechanism, including means comprising shuttle mechanism for coiling a series of intact pile loops around said warp threads across the fabric.

19. In a loom, means for holding the warp threads, and pile-loop forming mechanism, including pile wires and means comprising shuttle mechanism for weaving a series of pile loops with separate weft threads across the fabric.

20. In a loom, means for holding the warp threads, and pile-loop forming mechanism, including pile wires and means comprising shuttle mechanism for coiling dissimultaneously a series of pile loops around the warp threads across the fabric.

21. In a loom, means for holding the warp threads, and pile-loop forming mechanism, including pile wires and coöperating means for weaving simultaneously a plurality of sections of pile loops across the fabric, comprising means for weaving dissimultaneously the pile loops of each section.

22. In a loom, means for holding the warp threads, and pile-loop forming mechanism, including pile wires and coöperating means for weaving concurrently a plurality of sections of pile loops across the fabric, comprising means for weaving progressively the pile loops of each section.

23. In a loom, means for holding the warp threads, and pile-loop forming mechanism, including pile wires and coöperating means for weaving a plurality of sections of pile loops across the fabric, comprising means for simultaneously forming pile loops in all the sections and step by step in each section, whereby when a section is completed an entire row of pile loops across the fabric will be completed.

24. In a loom, means for holding the warp threads, and pile-loop forming mechanism, including means to coil the pile loops around the individual warp threads dissimultaneously across the fabric, and means for simultaneously cutting all the pile loops of a given transverse row.

25. In a loom, means to hold the warp threads, weaving means to weave pile loops on said warp threads in succession transversely of the fabric, and pile-loop forming hooks to engage and retain the loop portions after one end thereof has been woven to the warp threads and before the other end thereof has been woven to the warp threads.

26. In a loom, means to hold the warp threads, weft weaving means to interweave weft threads with said warp threads, pile loop forming hooks to form pile loops in said weft threads, and separate means extending transversely of the loom to hold the weft threads lifted at the loop forming regions thereof while said hooks engage the lifted threads.

27. In a loom, means to hold the warp threads, weaving means, pile-loop forming hooks, and a reed arranged to have its hand rail lift the loop forming portions in position to be engaged by said hooks.

28. In a loom, means to hold the warp threads, weaving means, movable pile-loop forming hooks, and means to bind the pile-loop thread over said hooks to be engaged and retained by the latter at the fell during the formation of succeeding loops.

29. In a loom, means to hold the warp threads, weaving means, pile-loop forming hooks, means to bend the loop threads and thereby lift the loop-forming portions, mechanism for advancing said hooks and said lifting means to meet in loop-forming relation at the fell, a warp-thread lifter, and means for raising said lifter at the fell while the pile loops are being formed.

30. In a loom, means for holding the warp threads, and weaving mechanism, including a plurality of groups of pattern shuttles, pattern mechanism for selecting any shuttle in any of said groups, pattern shedding mechanism for shedding the warp threads to coöperate with said pattern shuttles, binder shuttle mechanism, and binder shedding mechanism therefor.

31. In a loom, means for holding the warp threads, and weaving mechanism, including a plurality of groups of pattern shuttles to weave across the loom, pattern mechanism for selecting any shuttle in any of said groups, pattern shedding mechanism for shedding the warp threads to coöperate with said pattern shuttles, binder shuttle mechanism, binder shedding mechanism therefor, and operating mechanism for said binder shuttle mechanism to lay a binder thread only after the completion of the pattern weaving across the loom.

32. In a loom, means for holding the warp threads, knot-weaving mechanism, binder weaving mechanism, means for operating the knot-weaving mechanism a plurality of times to coil the knot thread around a corresponding plurality of warp threads, but to make only one complete line of weaving before the lay beats up, and means for then operating the lay.

33. In a loom, a lay, knot-tying shuttle mechanism to coil the shuttle yarn around the warp threads, shedding mechanism therefor, and mechanism adapted to operate said shedding mechanism a plurality of times for said knot-tying shuttle mechanism between successive to-and-fro movements of the lay.

34. In a loom, a lay, knot-weaving mechanism, shedding mechanism therefor, binder-weaving mechanism, and operating mechanism adapted to operate the lay to beat up the woven knots once only for a plurality of shedding movements and knot-weaving movements and once for each binder-weaving movement.

35. In a loom, a lay, pattern-shuttle weaving mechanism, shedding mechanism for said pattern-shuttle weaving mechanism, binder weaving mechanism, and mechanism adapted to operate said pattern-shuttle weaving mechanism a plurality of times between successive movements of the lay and to operate said lay once for each binder weaving operation.

36. In a loom, means for holding the warp threads, and weaving mechanism, including a binder shuttle mechanism for laying binder thread entirely across the fabric, a group of pattern shuttles located between the sides of the loom for weaving a part only of the width of the fabric, shuttle shifters for shifting any desired shuttle of said group with a weaving movement, and means, including pattern mechanism, for relatively moving the shuttle shifters and the shuttles into desired relative position for the weaving operation of any shuttle of the group by the adjacent shuttle shifter, and mechanism for operating said shuttle shifters to shift the desired shuttle.

37. In a loom, means for holding the warp threads, and weaving mechanism, including binder shuttle weaving mechanism, a plurality of groups of pattern shuttles, shuttle shifters for shifting the shuttle of each group, supporting means for said shuttles and shuttle shifters, and means including pattern mechanism for relatively moving the shuttle shifters and the shuttles into desired relative position for the operation of any shuttle of a group by the adjacent shuttle shifter, and mechanism for operating said shuttle shifters to shift the selected shuttles in weaving.

38. In a loom, means for supporting the warp threads, and weft pattern weaving mechanism, including a plurality of groups of shuttles for weaving a plurality of different patterns in a single transverse line of weaving across the loom, and means for varying the selective order of the shuttles for any given weaving.

39. In a loom, a plurality of groups of shuttles arranged across the loom, mechanism for shifting said groups of shuttles transversely of the loom for separate shuttle-weaving operations, pattern-selecting mechanism adapted to make different selections of shuttles from such different groups as desired for each of said separate shuttle-weaving operations, and means to give the selected shuttles a to-and-fro weaving movement after each selection.

40. In a loom, the combination with a group of shuttles, of pattern selecting mechanism having varying shuttle selecting means in the direction of its length and also in the direction of its width, and means adapted to give relative shuttle selective movements in both of said directions.

41. In a loom, the combination with a group of shuttles, of pattern selecting mechanism having varying shuttle selecting means in the direction of its length and also in the direction of its width, means adapted to give relative pattern selective movements for the shuttle in both of said directions, and mechanism to give the selected shuttle a to-and-fro weaving movement after each of said pattern selective movements.

42. In a loom, the combination with a group of shuttles, and means for giving said shuttles a step-by-step movement transversely of the loom, of pattern selective mechanism having varying shuttle selecting means in the direction of its width for varying the shuttle selection on said step-by-step movement, and shuttle selecting means also in the direction of its length for bringing in new combinations of variations for succeeding step-by-step movements, a lay, and means for operating said lay after each selective shuttle movement in said first mentioned direction.

43. In a loom, the combination with a group of shuttles, of pattern selecting mechanism having varying shuttle selecting means in the direction of its length and also in the direction of its width, and means adapted to give a plurality of relative selective shuttle movements in one of said directions to one movement in the other of said directions.

44. In a loom, the combination with a group of shuttles, of pattern selecting mechanism having successive horizontal rows of separate shuttle selecting means, feeding mechanism to bring said rows into operative position one at a time, and means adapted to give a relative horizontal shuttle selective movement for selecting the shuttles with reference to the successive separate shuttle selecting means of one of said rows at a time.

45. In a loom, the combination with a group of shuttles, of pattern selecting mechanism having successive horizontal rows of separate shuttle selecting means, feeding mechanism to bring said rows into operative position one at a time, a shuttle selector for positioning the shuttle adapted to be operated with reference to said separate shuttle selecting means, and means adapted to give a relative shuttle selecting movement between said selector and the said separate successive shuttle selecting means of each row of said pattern mechanism and one row at a time.

46. In a loom, a plurality of groups of shuttles across the loom, the shuttles of each group being arranged for separate, independent selection, pattern selecting mechanism having varying selecting means in the direction of its length and also in the direction of its width, and means adapted to give different relative shuttle selective movements as desired with reference to all of said groups of shuttles simultaneously.

47. In a loom, a plurality of groups of shuttles across the loom, the shuttles of each group being arranged for separate, independent selection, pattern selecting mechanism having varying selecting means in the direction of its length and also in the direction of its width, means adapted to give different relative shuttle selective movements as desired with reference to all of said groups of shuttles simultaneously, and shuttle shifting mechanism to give all of the selected shuttles a simultaneous weaving movement after each selective movement.

48. In a loom, a plurality of separate groups of shuttles across the loom in which the shuttles are adapted to be varied in their relative positions in the different groups, pattern selecting mechanism having successive horizontal rows of separate shuttle selecting means, feeding mechanism to bring said rows into operative position one at a time, and means to move the groups of shuttles transversely of the loom for successive weaving operations, actuating means responsive to the successive separate horizontal shuttle selecting means for selecting said shuttles of such groups as are required by said pattern mechanism in the successive positions of said groups across the loom, and means for giving the selected shuttles a to-and-fro weaving movement after each selection.

49. In a loom, means to hold the warp threads, a shuttle, warp lifting mechanism, shuttle shifting mechanism, operating mechanism, for the warp lifting mechanism and the shuttle shifting mechanism to weave an oriental-knot fabric, adapted to lift certain warp threads dissimultaneously and to shift the shuttle beneath a lifted warp thread and, when a lifted thread is lowered, to shift the said shuttle back over the lowered thread and under such other as is then lifted, to form the said oriental knot, beating up means for then moving the laid shuttle-thread to the fell, said moving means remaining inoperative during the aforesaid shuttle movements of weaving one oriental knot, and means causing the repetition of said weave step by step across the fabric.

50. In a loom, means to hold the warp threads, a shuttle, warp lifting mechanism, shuttle shifting mechanism, operating mechanism for the aforesaid adapted to place the shuttle thread in successive coils around warp threads at a plurality of places transversely of the fabric, and pile-loop forming means to deflect the shuttle thread into a pile loop between certain of said coils.

51. In a loom, means to hold the warp threads, a plurality of shuttles, pattern selecting mechanism, and means to operate the various shuttles one at a time in response to the pattern to place the shuttle thread of each selected shuttle in successive coils around warp threads at a plurality of places transversely of the fabric, including means adapted to bring all of said weaving movements of the separate shuttles into a single woven line across the fabric, and pile-loop forming means to deflect the shuttle threads into pile loops between certain of said coils in said woven line.

52. In a loom, a shuttle carrier, having a plurality of transverse shuttle guideways for the shuttles to slide in, a shuttle for each guideway, shuttle shifting mechanism including an actuator to slide a shuttle in its guideway in one direction but without leaving the carrier, and a separate actuator to shift the shuttle, still in the same carrier back in the opposite direction, and selective mechanism for changing the relative position of the shuttle carrier and shifting mechanisms in accordance with the particular shuttle to be operated.

53. In a loom, a plurality of independent shuttle carriers, each shuttle carrier, having a longitudinal thread slot, and a transverse guideway, empty on one side of the slot and occupied by a shuttle on the other side of the slot, a single shuttle for each guideway mounted to slide in said guideway transversely of said thread slot, means to relatively lift and lower a thread in said thread slot into positions respectively above and below said guideway, and shuttle shifting mechanism to shift the said shuttle across said slot in one direction when a thread is raised in the thread slot and in an opposite direction when the thread is lowered in said thread slot.

54. In a loom, a series of shuttle carriers each having a longitudinal thread slot and a transverse guideway, a shuttle mounted to slide in each guideway transversely of the thread slot, a lay, shedding means relatively to lift and lower a thread in each thread slot into positions respectively above and below the guideway and alternately to lift and lower a contiguous thread in the same slot, and shuttle-shifting mechanism to shift each shuttle across said slot in one direction over a lowered thread when the other thread is raised in the slot and then in an opposite direction back across the same slot when the threads are reversed in said slot, said shedding means and shifting mechanism being arranged and operating in the order for weaving oriental knots through said series, and the aforesaid operations being timed to one beat of the lay.

55. In a loom, a shuttle carrier, a longitudinal thread slot therein, a plurality of shuttles carried by said carrier for movement transversely of said thread slot, shuttle shifting mechanism, and pattern-controlled means to relatively raise and lower the latter and the carrier into position required to actuate any one of the shuttles.

56. In a loom, a shuttle carrier movable into the space of the fabric among the warp threads which are being woven together, a plurality of shuttles carried thereby for movement transversely thereof, and shuttle shifting mechanism including an axially rotary shifter having a laterally projecting finger adapted to be swung sidewise by the said axial movement to engage and shift a shuttle, and means to relatively move said shifter and carrier to select any one of said plurality of shuttles for movement.

57. In a loom, a shuttle carrier movable into the space of the fabric among the warp threads which are being woven together, a plurality of shuttles carried thereby for movement transversely thereof, a shuttle shifter in the form of an axially rotary rod having a laterally projecting finger to engage a shuttle, a pinion for rotating said rod, a longitudinally movable rack for rotating said pinion, and means for relatively moving said rod and carrier in the direction of the length of the rod to select a given one of said plurality of shuttles for subsequent movement by the rotation of the rod.

58. In a loom, a shuttle carrier, a plurality of shuttles carried thereby for movement transversely thereof, a shuttle shifter in the form of a rotary rod having a laterally projecting finger to engage a shuttle, a pinion for rotating said rod to shift the shuttle engaged, a longitudinally movable rack for rotating said pinion, and means for raising and lowering said rod and also said carrier to select the desired one of said plurality of shuttles to be shifted.

59. In a loom, a plurality of independently longitudinally movable shuttle carriers arranged side by side across the loom, a plurality of shuttles for each carrier, pattern controlled mechanism for moving said carriers into different longitudinal positions according to the particular shuttle of each carrier required for a weaving movement, and shuttle actuators for shifting the particular selected shuttle.

60. In a loom, a plurality of longitudinally movable shuttle carriers arranged side by side across the loom, a plurality of shuttles for each carrier, pattern controlled mechanism for moving said carriers into different longitudinal positions according to the particular shuttle of each carrier required for a weaving movement, and shuttle shifting mechanism for simultaneously shifting the selected shuttles transversely of their respective carriers.

61. In a loom, a plurality of longitudinally movable shuttle carriers arranged side by side across the loom, a plurality of shuttles for each carrier, pattern controlled mechanism for moving said carriers into different longitudinal positions according to the particular shuttle of each carrier required for a weaving movement, and shuttle actuators located to operate with reference to one carrier in one direction and an adjacent carrier in an opposite direction.

62. In a loom, a plurality of longitudinally movable shuttle carriers arranged side by side across the loom, a plurality of shuttles for each carrier, pattern controlled mechanism for moving said carriers into different longitudinal positions according to the particular shuttle of each carrier required for a weaving movement, and shuttle shifting mechanism, including a rotary rod having a laterally projecting shuttle-engaging finger located between each two shuttle carriers, and means for rocking all of said rods, for shifting the selected shuttles transversely of their respective carriers.

63. In a loom, a plurality of shuttle carriers, each having a T-slot across its face, a shuttle having a T-head mounted to slide in each slot, and opposite shuttle shifters between each two carriers, each shifter being in the form of a rock rod having a projecting finger to engage the shuttle close to said head for sliding one adjacent shuttle in its slot when the rod is rocked in one direction and for sliding the other adjacent shuttle when the rod is rocked in the other direction.

64. In a loom, means for holding the warp threads, a plurality of groups of shuttles, independently movable means for carrying each group of shuttles, selective mechanism for independently selecting the desired shuttle of each group for a given weaving movement, and mechanism for giving the selected shuttles said weaving movement, all of said shuttles extending lengthwise of said warp threads, side by side close to each other and having means for delivering the shuttle thread from the end of the shuttle toward the fell.

65. In a loom, means for supporting the warp threads, a series of shuttles each provided with means for holding a vertically wide and transversely narrow and long thread mass mounted side by side across the loom, each shuttle extending in the direction of said length of its thread mass lengthwise of the warp threads to a greater distance than its other dimensions, mechanism for giving said shuttles a simultaneous weaving movement, each shuttle coöperating with the warp threads located in its position of movement, and shedding mechanism for shedding a set of warp threads for each shuttle.

66. In a loom, a shuttle carrier, means normally holding said carrier out of weaving position, a plurality of shuttles carried by said carrier, and pattern controlled positioning mechanism for said carrier including a selector having a series of stepped notches to engage said carrier as required by the pattern, and means for thereafter moving said selector.

67. In a loom, a series of shuttle carriers and their shuttles mounted side by side across the loom, yielding means for moving each carrier to inoperative position, means for moving said carriers to operative position, and a positively actuated transverse safety device for insuring the movement of all of said carriers to inoperative position when not required in operative position.

68. In a loom, a series of shuttle carriers and their shuttles mounted side by side across the loom, yielding means for moving each carrier to inoperative position, means for moving said carriers to operative position, including a notched pusher for each carrier, pattern controlled means for moving each pusher into position to engage its carrier with some one of its notches, and means to actuate all the pushers to move said carriers to weaving position.

69. In a loom, a shuttle carrier and its shuttle, a pivoted actuator mounted to swing bodily and provided at one end with stepped notches to engage said carrier for moving the latter and adjacent its other end with means to be engaged by a pattern device, said pattern device, a spring normally holding said actuator out of engagement with said carrier, means for moving said actuator when engaged with said carrier, and locking means separate from the aforesaid mechanism for locking said actuator and carrier together, as positioned by the pattern device, during said movement.

70. In a loom, a series of shuttle carriers arranged side by side across the loom longitudinally movable, a series of pushers, one for each carrier, a swinging shaft supporting said pushers to swing in the direction of said carriers, each pusher having a series of stepped notches, and pattern mechanism for actuating said pushers to bring one or the other of the notches of a pusher into engagement with its carrier, whereby, upon the swinging of said shaft, said carriers will be thereby moved to varying distances in accordance with the pattern.

71. In a loom, a series of shuttle carriers longitudinally movable side by side across the loom, a series of pushers, one for each carrier, a swinging shaft supporting said pushers to swing in the direction of said carriers, each pusher having a series of stepped notches, pattern mechanism for actuating said pushers to bring one or the other of the notches of a pusher into engagement with its carrier, whereby, upon the swinging of said shaft, said carriers will be thereby moved to varying distances in accordance with the pattern, and means for simultaneously shifting said carriers step by step for successive weaving movements.

72. In a loom, a series of shuttle carriers longitudinally movable side by side across the loom, a series of pushers, one for each carrier, a swinging shaft supporting said pushers to swing in the direction of said carriers, each pusher having a series of stepped notches, pattern mechanism for actuating said pushers to bring one or the other of the notches of a pusher into engagement with its carrier, whereby, upon the swinging of said shaft, said carriers will be thereby moved to varying distances in accordance with the pattern, said pattern mechanism having a plurality of different controlling devices extending in a horizontal line, and means for causing relative lateral step by step movement between said pushers and said pattern mechanism to bring different controlling devices into controlling relation to a given pusher at each successive lateral step by step movement.

73. In a loom, a series of vertically reciprocable shuttle carriers, a plurality of shuttles mounted in each carrier for horizontal movement, a series of shuttle shifters for moving the shuttles horizontally, vertically movable supporting means for said shuttle carriers and shifters, and means for relatively moving said carriers and shifters to bring the latter into operative relation to any one of the shuttles of a given carrier as desired.

74. In a loom, a series of vertically reciprocable shuttle carriers, a plurality of shuttles mounted in each carrier for horizontal movement, a series of shuttle shifters for moving the shuttles horizontally, vertically movable supporting means for said shuttle carriers and shifters, and a series of pattern-controlled vertically moving actuators for moving said carriers to varying positions.

75. In a loom, a series of independently vertically reciprocable shuttle carriers, a plurality of shuttles mounted in each carrier for horizontal movement, a series of shuttle shifters for moving the shuttles horizontally, vertically movable supporting means for said shuttle carriers and shifters, and means for simultaneously moving all of said shifters to an unvarying position.

76. In a loom, a transverse guide beam, a carrier bar mounted to slide longitudinally on said beam, a series of shuttle carriers mounted to move to varying, independent positions transversely of said carrier bar, shuttles carried by said carriers, coöperating mechanism to give said shuttles a weaving movement, and step by step mechanism to move said carrier bar on said beam after a weaving movement.

77. In a loom, a transverse guide beam, a carrier bar mounted to slide longitudinally on said beam, a series of shuttle carriers independently mounted to move varying distances transversely of said carrier bar, shuttles carried by said carriers, coöperating mechanism to give said shuttles a weaving movement, and step by step mechanism to move said carrier bar a succession of steps in one direction in unison with said weaving and then to retract said bar to its original position at the end of said series.

78. In a loom, a guide beam extending transversely of the loom, a carrier bar mounted to slide longitudinally on said beam, a series of shuttle carriers mounted to move transversely of said carrier bar, shuttles carried by said carriers, a shifter carrier movable with said carrier bar, and a series of shuttle shifters mounted therein for shifting the shuttles.

79. In a loom, a transverse guide beam, a carrier bar mounted to slide longitudinally on said beam, a series of shuttle carriers mounted to move transversely of said carrier bar, shuttles carried by said carriers, a shifter carrier movable with said carrier bar, a series of rotary shuttle shifters mounted therein, and means carried by said shifter carrier for simultaneously rotating said shuttle shifters.

80. In a loom, a transverse guide beam, a carrier bar mounted to slide longitudinally on said beam, a series of shuttle carriers mounted to move transversely of said carrier bar, a plurality of shuttles carried by each shuttle carrier, a shifter carrier movable with said carrier bar, a series of shuttle shifters mounted therein, and selective mechanism for moving said shuttle carriers to varying extents according to the particular shuttle of each carrier which it is desired to shift.

81. In a loom, a transverse guide beam, a carrier bar mounted to slide longitudinally on said beam, a series of shuttle carriers mounted to move transversely of said carrier bar, a plurality of shuttles carried by each shuttle carrier, a shifter carrier movable with said carrier bar, a series of shuttle shifters mounted therein, selective mechanism for moving said shuttle carriers to varying extents according to the particular shuttle of each carrier which it is desired to shift, and means for moving all of said shuttle shifters to operative position with relation to the shuttles.

82. In a loom, weaving mechanism, including a series of shuttle carriers and their shuttles spaced apart across the loom in sections a plurality of weaving movements wide, step by step mechanism to move said carriers and their shuttles transversely after each weaving movement, whereby the weaving proceeds progressively and simultaneously in each section across the loom, and means to move said carriers independently to varying positions transversely of said weaving movement.

83. In a loom, weaving mechanism, including a series of independently variable shuttle carriers and their shuttles spaced apart across the loom in sections a plurality of weaving movements wide, each carrier having a plurality of shuttles, step by step mechanism to move said carriers and their shuttles transversely after each weaving movement, and means coöperating with said step by step mechanism for restoring said carriers and their shuttles to starting position when each section has been thus woven.

84. In a loom, weaving mechanism, including a series of separately movable shuttle carriers and their shuttles spaced apart across the loom in sections a plurality of weaving movements wide, step by step mechanism to move said carriers and their shuttles transversely after each weaving movement, means coöperating with said step by step mechanism for restoring said carriers and their shuttles to starting position when each section has been thus woven, binder weaving mechanism, and means to operate said binder weaving mechanism to weave in binder thread behind said sectional weaving while said carriers and shuttles are being restored.

85. In a loom, warp thread supporting means, and pattern weaving mechanism, including means for raising the warp threads in a predetermined order simultaneously in a plurality of sections across the loom, a plurality of shuttles for weaving each section, and shuttle-selecting mechanism, including means for differently varying the order of shuttle selection for the weaving movement in the different sections.

86. In a loom, a plurality of groups of shuttles, a carrier for each group, means to move said carriers independently to varying extents, beating up mechanism, and an emergency device capable of positively lifting said carriers after the completion of the weaving movements and before the beating up movement.

87. In a loom, means to support the warp threads, a plurality of independently movable groups of shuttles, selective pattern mechanism for selecting any shuttle in any group by means of said independent movement, a lay, and operating means for said lay capable of maintaining a dwell of the lay in its back position while the shuttles are in weaving position.

88. In a loom, means for supporting the warp threads, and weaving mechanism, including a plurality of groups of shuttles, selective means to move said groups up and down varying distances, actuators for the shuttles, means to move said actuators up and down unvarying distances, and means to move said actuators laterally for shifting the shuttles.

89. In a loom, pattern shedding mechanism, including lifter wires having hooked upper ends, a vertically movable lifting knife to engage said hooks for pattern weaving, indicating wires guided transversely to said lifter wires and each provided with a guide eye for receiving its lifter wire, springs normally holding said indicating wires and their lifting wires in a direction away from said lifting knife, a pattern device movable toward and from said indicating wires to select and move certain of the latter in accordance with the pattern, said wires having engaging devices separated from said hooks to be engaged by binder shedding knives, said shedding knives movable independently of said lifting knife, one shedding knife for engaging one set of said lifter wires and the other for engaging the remainder of said lifter wires, means for throwing said shedding knives alternately into operative position, and means for lifting said shedding knives for making a shed for binder thread.

90. In a loom, weaving mechanism, a pattern control therefor including a pattern device having a plurality of longitudinal series of pattern governing devices, connections between said weaving mechanism and said pattern control, including means responsive to the successive governing devices of a longitudinal series, and means for maintaining one longitudinal series in operative position until said connection has responded to all of its said single longitudinal series of governing devices and then permitting the next longitudinal series to be brought into operative position, and means for bringing said longitudinal series, one by one, into operative position.

91. In a loom, weaving mechanism, a pattern control therefor including a pattern device having a plurality of longitudinal series of pattern governing devices, connections between said weaving mechanism and said pattern control, including means responsive to the successive governing devices of a longitudinal series, means including a pawl and ratchet for actuating said pattern control to bring the successive longitudinal series of governing devices successively into operative position, and restraining means for rendering said pawl inoperative during the control of said weaving means by the successive governing devices one by one of a single longitudinal series.

92. In a loom, pattern weaving mechanism, including pattern shuttles, a series of pattern controlled actuators for positioning the pattern shuttles, means normally holding said actuators in inoperative position, binder weaving mechanism, locking means for locking the selected actuators in operative position for their pattern weaving movements, and tripping mechanism for unlocking said locking means while the binder weaving mechanism is operating.

93. In a loom, pattern weaving mechanism, including pattern shuttles, a series of pattern controlled actuators for positioning the pattern shuttles, means normally holding said actuators in inoperative position, binder weaving mechanism, including binder shedding mechanism, locking means for locking the selected actuators in operative position for their pattern weaving movement, and tripping means actuated by said shedding mechanism for releasing said selectors while the binder weaving mechanism is operating.

94. In a loom, a series of groups of pattern shuttles for weaving at intervals across the loom, pattern selective mechanism including means for selecting with reference to the pattern any shuttle of each group for a particular weaving operation, and shedding mechanism to coöperate with the selected shuttles in accomplishing the weaving.

95. In a loom, a series of groups of pattern shuttles for weaving at intervals across the loom, pattern selective mechanism including means for selecting with reference to the pattern any shuttle of each group for a particular weaving operation, and shedding mechanism, including a pattern control, for accomplishing the shedding in accordance with the shedding pattern.

96. In a loom, a group of pattern shuttles, a movable pattern control governing the selection of the shuttles for weaving, selective means between said pattern control and shuttles for making a plurality of varying selections of shuttles from said single group in response to the pattern control, binder weaving mechanism, and a separate automatic means for holding said pattern control inoperative during the operation of the binder weaving mechanism.

97. In a loom, a group of pattern shuttles, a swinging pattern control governing the selection of the shuttles for weaving, selective means between said pattern control and shuttles for selecting a shuttle in response to the swinging movement of the pattern control, binder weaving mechanism, and means for stopping said pattern control in its inoperative position during the operation of the binder weaving mechanism.

98. In a loom, a vertically movable shuttle carrier, a group of shuttles carried thereby, a swinging pattern chain, selective means responsive to said pattern chain for moving said shuttle carrier to weaving position in accordance with the particular shuttle required, binder weaving mechanism, and means for rendering said pattern chain inoperative, and hence leaving the shuttle carrier and shuttles in inoperative position, during said binder shuttle weaving operation.

99. In a loom, a group of pattern shuttles, a swinging pattern chain, means responsive to the swinging movement of said chain to select the particular shuttle required for weaving, a lay and operating mechanism therefor, binder weaving mechanism, and means operative on the backward movement of the lay for rendering said pattern chain inoperative during the operation of said binder weaving mechanism.

100. In a loom, a group of pattern shuttles, a swinging pattern chain, means responsive to the swinging movement of said chain to select the particular shuttle required for weaving, a lay and operating mechanism therefor, a binder shuttle, binder shedding mechanism, means operating on the backward movement of the lay to render said pattern chain inoperative, and means operating during the operation of said lay to actuate said binder shedding mechanism for the binder weaving movement.

101. In a loom, a group of pattern shuttles, a swinging pattern chain, means responsive to the swinging movement of said chain to select the particular shuttle required for weaving, a binder shuttle and its operating mechanism, and a controlling chain for rendering the pattern chain inoperative during the operation of the binder mechanism and means for rendering the binder mechanism operative.

102. In a loom, a series of groups of pattern shuttles for weaving at intervals across the loom, a pattern chain and selective mechanism responsive thereto for selecting any particular shuttle desired in each group for a given weave, step by step mechanism for shifting said groups of shuttles in the direction of the weaving movement after each pattern selective and weaving operation, binder weaving mechanism, and a controlling chain for governing the order of operation of said pattern weaving, step by step movement, and binder weaving.

103. In a loom, a series of groups of pattern shuttles for weaving at intervals across the loom, a pattern chain and selective mechanism responsive thereto for selecting any particular shuttle desired in each group for a given weave, step by step mechanism for shifting said groups of shuttles in the direction of the weaving movement after each pattern selective and weaving operation, a lay and its moving mechanism, binder weaving mechanism, and a controlling chain operating in unison with said lay for governing the order of operation of said pattern weaving, step by step movement, and binder weaving and for controlling the feeding movement of the pattern chain.

104. In a loom, means for supporting the warp threads, binder weaving mechanism, knot-tying mechanism for tying a series of knots in an intact thread, and beating up mechanism, the aforesaid mechanisms including means for pulling the thread of each knot taut while still intact just as it is being beaten up at the fell.

105. In a loom, means for supporting the warp threads, binder weaving mechanism, knot-tying mechanism for interweaving the knot yarn with the warp threads at a point remote from the fell, and beating up mechanism for thereafter beating the interwoven yarns up to the fell, the aforesaid mechanisms including means for pulling the thread of each knot taut just as it is being beaten up at the fell, and a pile wire, said pulling means including means for maintaining the pulled thread taut while being formed into a pile loop, and beaten up to the fell.

106. In a loom, means for supporting the warp threads, binder weaving mechanism, knot-tying mechanism for interweaving the knot yarn with the warp threads at a point remote from the fell and beating up mechanism for thereafter beating the interwoven yarns up to the fell, the aforesaid mechanisms including means for pulling the thread of each knot taut just as it is being beaten up at the fell, and a pile wire having a loop forming hook to engage said taut thread, said pulling means including means for maintaining the pulled thread taut while being formed into a pile loop and beaten up to the fell.

107. In a loom, means for supporting the warp threads, a series of movable hook-ended pile wires extending in the direction of said warp threads from the fell toward the front of the loom, weaving mechanism for interweaving the pile thread with the warp threads at a point remote from the fell and engaging a loop thereof over the hooked end of each pile wire, and means for moving said pile wires beneath the pile threads and into supporting relation therewith as the latter are being moved into loop-forming position.

108. In a loom, means for supporting the warp threads, weaving mechanism to interweave with said warp threads pile loop forming threads, a reed for beating up the interwoven pile threads before being hooked, a pile-loop forming hook, and means to move said hook toward said reed adjacent the fell into position to hook under and retain in loop form the beaten-up pile thread while further weaving continues.

109. In a loom, means for supporting the warp threads, weaving mechanism to interweave with said warp threads pile loop forming threads, a reed for beating up the interwoven pile threads before being hooked, a pile-loop forming hook, means to move said hook toward said reed adjacent the fell into position to hook under and retain in loop form the beaten-up pile thread while further weaving continues, and means for moving said hook forward with a pulling tension on the pile thread.

110. In a loom, means for supporting the warp threads, pile-loop weaving mechanism, a pile wire bar extending transversely of said warp threads, a series of pile wires carried by said bar in line with the warp threads, and means arranged to engage and support the pile loops when formed, and for moving said bar and pile wires in the direction of the fell to receive the pile loops, and then in an opposite direction to pull the weaving taut.

111. In a loom, means for supporting the warp threads, a pile wire bar extending transversely of said warp threads, a series of pile wires carried by said bar in line with the warp threads and arranged to engage and support the pile loops when formed, and means for moving said bar and pile wires in the direction of the fell to receive the pile loops, a warp lifting bar adjacent the fell, and means to raise the latter into lifting engagement with the warp threads when the pile loops are being formed.

112. In a loom, means for supporting the warp threads, a lay, and weaving mechanism, including a plurality of shuttles spaced at intervals across the loom and mounted independently of said lay, and selective operating mechanism for said shuttles capable of operating a shuttle at one point in the midst of the fabric and leaving all the rest of the shuttles inoperative.

113. In a loom, means for supporting the warp threads, pattern weaving mechanism, including shuttles, and supporting means for said shuttles maintaining them against movement lengthwise of the warp threads and provided with a straight up and down movement.

114. In a loom, means for supporting the warp threads, pattern weaving mechanism, including shuttles, and a lay having a beating-up movement from a position at the rear of said shuttles to the fell, said lay and weaving mechanism having coöperating power means for permitting the lay to move from the rear forward past the shuttles.

115. In a loom, means for supporting the warp threads, and means for interweaving with said warp threads a plurality of weft threads in a series of coils in intact weft threads about the warp threads, including mechanism for accomplishing said weaving in a single line of weaving across the loom, and severing mechanism for cutting the weft threads when so interwoven, said weaving means and severing mechanism being so relatively located and operative that said line of weaving is succeeded by and retained by a plurality of other lines of weaving prior to the severing of the said intact weft threads of said first mentioned line of weaving.

116. In a loom, means for supporting the warp threads, and means for interweaving with said warp threads a plurality of weft threads in a series of coils about the warp threads, and binder-thread weaving mechanism, the aforesaid mechanisms including means for maintaining the weft threads intact across a series of binder threads.

117. In a loom, means for supporting the warp threads, and means for interweaving with said warp threads a plurality of weft threads in a series of coils about the warp threads, binder thread weaving mechanism, and pile wires, the aforesaid mechanisms including means for maintaining the weft threads intact around a series of warp threads and pile wires and also intact in a direction lengthwise of the pile wires and warp threads.

118. In a loom, means for supporting the warp threads, and automatic pattern weaving mechanism containing means for coiling a plurality of weft yarns about the warp threads with the same woven pattern on both back and front of the web, and pile wires for supporting said weaving in pile loops on the front of the fabric, the aforesaid mechanisms including means maintaining the weft threads intact around a series of the warp threads and pile wires and also intact lengthwise of the pile wires and warp threads.

119. In a loom, means for supporting the warp threads, and weaving mechanism for weaving a plurality of weft threads in line with each other transversely across the loom, including means for forming pile loops connecting one interweaving with another in said weft weaving, means for beating up said weaving, and means for cutting said pile loops after the beating-up operation, whereby the weft character of the weaving is maintained in the finished fabric.

120. In a loom, means for supporting the warp threads, and weft pattern weaving mechanism, including a plurality of shuttles for weaving a plurality of different patterns in a single transverse line of weaving across the loom, and means for automatically permitting the omission of any given shuttle movement between certain of said patterns by rendering the shuttle inoperative while still in place in the loom and during the continuous weaving operation.

121. In a loom, means for supporting the warp threads, and weft pattern weaving mechanism, including a plurality of shuttles for weaving a plurality of different patterns in a single transverse line of weaving across the loom, selective means for varying said plurality of patterns as desired, pattern shedding mechanism for moving the warp threads in an unvarying order for all pattern weaving across the loom, and means for automatically permitting the omission of any given shuttle movement in the course of the said weft pattern weaving.

122. In a loom, means for supporting the warp threads, a plurality of groups of shuttles at intervals across the loom for weaving different patterns in different sections in a single transverse line of weaving across the loom, shuttle selecting mechanism for varying the order of shuttle selection in the different groups of shuttles as desired, pattern shedding mechanism for moving the warp threads in an unvarying order for all pattern weaving across the loom, mechanism for giving said groups of shuttles a step-by-step movement for the successive weaving movements in the respective sections, means for giving the selected shuttles a to and fro weaving movement in coöperation with the said warp shedding, and means for rendering all the shuttles in any group inoperative on any given weave.

123. In a loom, means for supporting the warp threads, and weft pattern weaving mechanism for weaving in coils around said warp threads with a plurality of different weft threads at intervals across the loom in a single line of weaving, and means for automatically permitting the omission of any given coil-weaving movement where desired in said line of weaving.

124. In a loom, warp-thread supporting means, and pattern weaving mechanism, including a plurality of groups of shuttles, and means for automatically permitting any one of said groups to omit a normal weaving shuttle movement while others thereof are weaving.

125. In a loom, warp-thread supporting means, pattern weaving mechanism, including shuttles, means coöperating therewith to weave pile loops in accordance with the pattern, and means permitting any shuttle or all the shuttles to omit a normal weaving movement when desired.

126. In a loom, warp-thread supporting means, and pattern weaving mechanism, including a plurality of groups of shuttles, a pattern mechanism varying the selection of the shuttles in said different groups for one weaving movement, and pattern controlling means governing the operation of said pattern mechanism.

127. In a loom, means to support the warp threads, a plurality of groups of pattern shuttles, selectors for variously positioning said groups to bring the shuttles of said respective groups into weaving position in varying orders, means for continuously operating said selectors, means normally holding said selectors to move in inoperative positions, pattern mechanism for shifting said selectors into operative position, binder weaving mechanism, and safety means actuated by said binder mechanism for preventing said selectors from having movement in their operative position during the laying of binder thread.

In testimony whereof, I have signed my name to this specification, in the presence of two subscribing witnesses.

THOMAS P. WALSH.

Witnesses:
 EDWARD R. BARKER,
 GEO. H. MAXWELL.